US008659622B2

(12) United States Patent (10) Patent No.: US 8,659,622 B2
Dhawan (45) Date of Patent: Feb. 25, 2014

(54) SYSTEMS AND METHODS FOR CREATING AND EDITING SEAM CARVING MASKS

(75) Inventor: Anmol Dhawan, Ghaziabad (IN)

(73) Assignee: Adobe Systems Incorporated, San Jose, CA (US)

(*) Notice: Subject to any disclaimer, the term of this patent is extended or adjusted under 35 U.S.C. 154(b) by 981 days.

(21) Appl. No.: 12/551,178

(22) Filed: Aug. 31, 2009

(65) Prior Publication Data

US 2013/0120442 A1 May 16, 2013

(51) Int. Cl.
G09G 5/00 (2006.01)
(52) U.S. Cl.
USPC .......................... 345/626; 345/619; 345/629
(58) Field of Classification Search
USPC .................................................. 345/619, 626
See application file for complete search history.

(56) References Cited

U.S. PATENT DOCUMENTS

| 4,394,693 | A | 7/1983 | Shirley |
| 5,434,414 | A | 7/1995 | Berlad et al. |
| 5,438,202 | A | 8/1995 | Matanzon et al. |
| 5,559,901 | A | 9/1996 | Lobregt |
| 5,577,179 | A | 11/1996 | Blank |
| 5,587,742 | A | 12/1996 | Hau et al. |
| 5,732,230 | A | 3/1998 | Cullen et al. |
| 5,768,413 | A | 6/1998 | Levin et al. |
| 5,790,708 | A | 8/1998 | Delean |
| 5,906,005 | A | 5/1999 | Niskala et al. |
| 6,157,389 | A | 12/2000 | Knowlton |
| 6,195,445 | B1 | 2/2001 | Dubuisson-Jolly et al. |
| 6,563,964 | B1 | 5/2003 | Hallberg et al. |
| 6,597,411 | B1 | 7/2003 | Selby et al. |
| 6,782,128 | B1 * | 8/2004 | Rinehart ....................... 382/167 |
| 6,825,857 | B2 | 11/2004 | Harasimiuk |
| 6,919,903 | B2 | 7/2005 | Freeman et al. |
| 6,943,807 | B2 | 9/2005 | Xavier |
| 6,985,641 | B1 | 1/2006 | Michel et al. |

(Continued)

FOREIGN PATENT DOCUMENTS

EP 1968008 9/2008

OTHER PUBLICATIONS

"Getting to know quick masks in photoshop cs2—for dummies", http://www.dummies.com/how-to/content/getting-to-know-quick-masks-in-photoshop-cs2.html, http://web.archive.org/we/20081205155137/http://www.dummies.com/how-to/content/getting-to-know-quick-masks-in-photoshop-cs2.html. Dec. 5, 2008.*

(Continued)

Primary Examiner — Michelle L Sams
(74) Attorney, Agent, or Firm — Wolfe-SBMC

(57) ABSTRACT

Systems and methods for creating and editing seam carving masks may allow a user to combine masks, and/or to modify automatically generated suggested masks, manually created masks, combination masks, or previously stored masks using tools of a graphical user interface in a graphics application (e.g., a mask brush or mask eraser). The method may include accessing data representing an image and automatically generating a suggested mask for the image (e.g., based on a color or color range, a threshold energy value, or input specifying two or more previously stored masks for combination). The method may include displaying the suggested mask as an overlay of the image, highlighting mask pixels using a respective color or pattern. The user may indicate pixels to be added to or removed from the suggested mask to produce a modified mask for application in an image editing operation (e.g., a resizing, filtering, or feature identification operation).

20 Claims, 11 Drawing Sheets

(56) References Cited

U.S. PATENT DOCUMENTS

| | | | |
|---|---|---|---|
| 7,038,185 B1 | 5/2006 | Tumblin et al. | |
| 7,168,038 B2 | 1/2007 | Lui et al. | |
| 7,386,183 B2 | 6/2008 | Tamura | |
| 7,411,628 B2 | 8/2008 | Tian et al. | |
| 7,477,800 B2 | 1/2009 | Avidan et al. | |
| 7,529,429 B2 | 5/2009 | Rother et al. | |
| 7,532,771 B2 | 5/2009 | Taylor et al. | |
| 7,602,398 B2 | 10/2009 | Zhou et al. | |
| 7,747,107 B2 | 6/2010 | Avidan et al. | |
| 7,778,492 B2 | 8/2010 | Ignatchenko et al. | |
| 7,823,211 B2 | 10/2010 | Matsukawa et al. | |
| 7,873,211 B1 | 1/2011 | Grundmann et al. | |
| 8,023,153 B2 | 9/2011 | Bernal et al. | |
| 8,077,356 B2 | 12/2011 | Bernal et al. | |
| 8,077,357 B2 | 12/2011 | Bernal et al. | |
| 8,098,404 B2 | 1/2012 | Bernal et al. | |
| 8,160,398 B1 | 4/2012 | Avidan et al. | |
| 8,180,177 B1* | 5/2012 | Intwala | 382/298 |
| 8,218,900 B1 | 7/2012 | Avidan et al. | |
| 8,265,424 B1 | 9/2012 | Avidan et al. | |
| 8,270,765 B1 | 9/2012 | Avidan et al. | |
| 8,280,186 B1 | 10/2012 | Avidan et al. | |
| 8,280,187 B1 | 10/2012 | Avidan et al. | |
| 8,280,191 B1 | 10/2012 | Avidan et al. | |
| 8,290,300 B2 | 10/2012 | Avidan et al. | |
| 8,358,876 B1 | 1/2013 | Gilra et al. | |
| 8,581,937 B2 | 11/2013 | Intwala | |
| 8,625,932 | 1/2014 | Intwala | |
| 2002/0006234 A1 | 1/2002 | Horiuchi | |
| 2003/0002736 A1 | 1/2003 | Maruoka et al. | |
| 2003/0234866 A1 | 12/2003 | Cutler | |
| 2006/0017739 A1 | 1/2006 | Fang et al. | |
| 2006/0072853 A1 | 4/2006 | Clarke et al. | |
| 2006/0104542 A1 | 5/2006 | Blake et al. | |
| 2006/0177150 A1 | 8/2006 | Uyttendaele et al. | |
| 2007/0025637 A1 | 2/2007 | Setlur et al. | |
| 2007/0136685 A1 | 6/2007 | Bhatla et al. | |
| 2007/0237420 A1 | 10/2007 | Steedy et al. | |
| 2008/0036789 A1* | 2/2008 | de Leon | 345/625 |
| 2008/0095470 A1 | 4/2008 | Chao et al. | |
| 2008/0143744 A1 | 6/2008 | Agarwala | |
| 2008/0198175 A1 | 8/2008 | Sun et al. | |
| 2008/0219587 A1* | 9/2008 | Avidan et al. | 382/276 |
| 2008/0267528 A1 | 10/2008 | Avidan et al. | |
| 2009/0033683 A1* | 2/2009 | Schiff et al. | 345/661 |
| 2009/0033773 A1 | 2/2009 | Kinoshita et al. | |
| 2009/0290794 A1 | 11/2009 | Marchesotti | |
| 2009/0317010 A1 | 12/2009 | Gerhard et al. | |
| 2010/0013827 A1 | 1/2010 | Fillion et al. | |
| 2010/0027876 A1 | 2/2010 | Avidan et al. | |
| 2010/0124371 A1 | 5/2010 | Jiang et al. | |
| 2010/0128181 A1 | 5/2010 | Jagmag | |
| 2010/0142853 A1 | 6/2010 | Fillion et al. | |
| 2010/0232729 A1 | 9/2010 | Peleg et al. | |
| 2010/0266208 A1 | 10/2010 | Downing et al. | |
| 2010/0303384 A1 | 12/2010 | Knee | |
| 2011/0182502 A1 | 7/2011 | Liang | |
| 2011/0200274 A1 | 8/2011 | Luo et al. | |
| 2011/0211771 A1 | 9/2011 | Rubenstein et al. | |
| 2012/0092357 A1 | 4/2012 | Wang et al. | |
| 2013/0120407 A1 | 5/2013 | Intwala | |
| 2013/0121619 A1 | 5/2013 | Intwala | |
| 2013/0127915 A1 | 5/2013 | Gilra | |

OTHER PUBLICATIONS

Simakov et al., "Summarizing Visual Data Using Bidirectional Similarity", IEEE Conference on Computer Vision and Pattern Recognition, 2008.*

Wolf et al., "Non-homogeneous Content-driven Video-retargeting", Proceedings of the 11th IEEE International Conference on Computer Vision, pp. 1-6, Rio de Janeiro, Brazil, Oct. 14-20, 2007.*

Avidan, Shai and Shamir, Ariel; "Seam carving for content-aware image resizing," ACM Transactions on Graphics (TOG) archive, vol. 26, Issue 3 (Jul. 2007), Proceedings of ACM SIGGRAPH 2007.

U.S. Appl. No. 12/184,060, filed Jul. 31, 2008.
U.S. Appl. No. 12/200,476, filed Aug. 28, 2008.
U.S. Appl. No. 12/197,913, filed Aug. 25, 2008.
U.S. Appl. No. 12/197,912, filed Aug. 25, 2008.

Michael J. Jones, James M. Rehg., "Statistical Color Models with Application to Skin Detection," International Journal of Computer Vision, 46, 1, Jan. 2002, pp. 81-96.

Vladimir Vezhnevets, Vassili Sazonov and Alla Andreeva, "A Survey on Pixel-Based Skin Color Detection Techniques," Proc. Graphicon-2003, pp. 85-92, Moscow, Russia, Sep. 2003.

U.S. Appl. No. 12/200,637, filed Aug. 28, 2008, Adobe Systems Incorporated, all pages.

alZahir, S., "A perceptually perfect image resizing scheme," International Conference on Consumer Electronics, 2005.. 2005 Digest of Technical Papers. Volume , Issue , Jan. 8-12, 2005 pp. 83-84.

U.S. Appl. No. 12/250,406, filed Oct. 31, 2008, Adobe Systems Incorporated, all pages.

U.S. Appl. No. 12/469,486, filed May 20, 2009, Adobe Systems Incorporated, all pages.

U.S. Appl. No. 12/184,039, filed Jul. 31, 2008, Adobe Systems Incorporated, all pages.

Itti L et al. "A Model of Saliency-Based Visual Attention for Rapid Scene Analysis" IEEE Transactions on Pattern Analysis and Machine Intelligence, IEEE Service Center, Los Alamitos, CA, US, vol. 20, No. 11 Nov. 1, 1998, pp. 1254-1259.

Wang, et al. "Optimized Scale-and-Stretch for Image Resizing," ACM Transactions on Graphics, vol. 27, No. 5, Dec. 2008, pp. 118-1 to 118-8.

Perez et al., 2003. Poisson Image Editing. SIGGRAPH'03. ACM, New York, NY, pp. 313-318.

Lui et al., "Automatic Estimation and Removal of Noise from a Single Image," IEEE Transactions on Pattern Analysis and Machine Intelligence, vol. 30, No. 2, Feb. 2008, 16 pages.

Suh et al., 2003. Automatic thumbnail cropping and its effectiveness. UIST '03: Proceedings of the 16th annual ACM symposium on User interface software and technology, ACM Press, New York, NY, USA, pp. 95-104.

Chen et al., 2003. A visual attention model for adapting images on small displays. Multimedia Systems 9, 4, pp. 353-364.

Agarwala et al., "Interactive digital photomontage," ACM Trans. Graph. 23, 3, 294-302, 2004.

Jacobs et al. 2003. Adaptive grid-based document layout. Proceedings of ACM SIGGRAPH, pp. 838-847.

Liu et al., 2005. Automatic image retargeting with fisheye-view warping. ACM UIST, pp. 153-162.

Setlur et al., 2005. Automatic image retargeting. Mobile and Ubiquitous Multimedia (MUM), ACM Press.

Gal et al., 2006. Feature aware texturing. Eurographics Symposium on Rendering.

Sun et al. 2005. Image completion with structure propagation. Proceedings of ACM SIGGRAPH, pp. 861-868.

Jia et al., 2006. Drag-and-drop pasting. Proceedings of SIGGRAPH, 6 pages.

Zomet, A., Levin, A., Peleg, S., and Weiss, Y., "Seamless image stitching by minimizing false edges," IEEE Transactions on Image Processing vol. 15, No. 4, Apr. 2006, 969-977.

Criminisi et al., 2003. Object removal by exemplar-based inpainting. IEEE Conference on Computer Vision and Pattern Recognition, pp. 417-424.

Bertalmio et al., 2003. Simultaneous structure and texture image inpainting. Proceedings IEEE Conference on Computer Vision and Pattern Recognition, 13 pages.

Drori et al. 2003. Fragment-based image completion. Proceedings of ACM SIGGRAPH, pp. 303-312.

Hwang and Chien, "Content-aware image resizing using perceptual seam carving with human attention model," 2008 IEEE International Conference on Multimedia and Expo, Apr. 26, 2008, all pages.

Andreadis, I. Amanatiadis, A.; "Digital Image Scaling," Proceedings of the IEEE Instrumentation and Measurement Technology Conference, 2005, May 16-19, 2005, vol. 3, pp. 2028-2032.

(56) References Cited

OTHER PUBLICATIONS

Zhang, Mingju; Zhang, Lei; Sun, Yanfeng; Feng, Lin; Ma Weiying; "Auto cropping for digital photographs," IEEE International Conference on Multimedia and Expo, 2005, Publication Date: Jul. 6-8, 2005.
Wang, et al., 2006, Simultaneous Matting and Compositing, Microsoft Research Technical Report, MSR-TR 2006-63 (May), 8 pages.
Santella et al., 2006. Gaze-based interaction for semiautomatic photo cropping. ACM Human Factors in Computing Systems (CHI), pp. 771-780.
U.S. Appl. No. 12/184,071, filed Jul. 31, 2008, Adobe Systems Incorporated, all pages.
U.S. Appl. No. 12/183,942, filed Jul. 31, 2008, Adobe Systems Incorporated, all pages.
U.S. Appl. No. 12/183,960, filed Jul. 31, 2008, Adobe Systems Incorporated, all pages.
U.S. Appl. No. 12/183,974, filed Jul. 31, 2008, Adobe Systems Incorporated, all pages.
U.S. Appl. No. 12/183,997, filed Jul. 31, 2008, Adobe Systems Incorporated, all pages.
U.S. Appl. No. 12/183,986, filed Jul. 31, 2008, Adobe Systems Incorporated, all pages.
U.S. Appl. No. 12/184,019, filed Jul. 31, 2008, Adobe Systems Incorporated, all pages.
U.S. Appl. No. 12/251,163, filed Oct. 14, 2008, Adobe Systems Incorporated, all pages.
Rubinstein, et al., "Improved Seam Carving for Video Retargeting," ACM Transactions on Graphics, vol. 27, No. 3, Aug. 2008, pp. 16-1 to 16-10.
"Advisory Action", U.S. Appl. No. 12/251,163, (Aug. 10, 2012), 3 pages.
"Final Office Action", U.S. Appl. No. 12/200,637, (Oct. 25, 2012), 23 pages.
"Final Office Action", U.S. Appl. No. 12/251,163, (May 9, 2012), 20 pages.
"Final Office Action", U.S. Appl. No. 12/469,486, (Nov. 13, 2012), 30 pages.
"Final Office Action", U.S. Appl. No. 12/469,508, (Jul. 10, 2012), 15 pages.
"Non-Final Office Action", U.S. Appl. No. 12/200,637, (Apr. 12, 2012), 24 pages.
"Non-Final Office Action", U.S. Appl. No. 12/251,163, (Oct. 9, 2012), 19 pages.
"Non-Final Office Action", U.S. Appl. No. 12/251,163, (Dec. 9, 2011), 14 pages.
"Non-Final Office Action", U.S. Appl. No. 12/469,486, (Jun. 7, 2012), 14 pages.
"Non-Final Office Action", U.S. Appl. No. 12/469,508, (Feb. 22, 2012), 13 pages.
"Notice of Allowance", U.S. Appl. No. 12/469,508, (Sep. 18, 2012), 8 pages.
"Restriction Requirement", U.S. Appl. No. 12/200,637, (Dec. 6, 2011), 5 pages.
"Restriction Requirement", U.S. Appl. No. 12/469,508, (Nov. 3, 2011), 6 pages.
"U.S. Application as Filed", U.S. Appl. No. 12/469,508, (May 20, 2009), 101 pages.
Lee, et al., "Fast Seam Carving Using Partial Update and Divide and Conquer Method", *Signal Processing and Information Technology (ISSPIT)*, 2009, p. 107-112, (2009), 1 page.
Rother, Carsten et al., "AutoCollage", *Proceedings of SIGGRAPH*, (Jul. 29, 2006), 6 pages.
Rudy, Gabe "seam-carving-gui A GUI for Content Aware Image Resizing (Retargeting, SeamCarving)", Retrieved from <http://code.google.com/p/seam-carving-gui/> on Apr. 4, 2012, 3 pages.
Vaquero, Daniel et al., "A survery of image retargeting techniques", *Proceedings fo SPIE 7798, Applications of Digital Image Processing XXXIII, Nokia Research Center*, (Sep. 7, 2010), 15 pages.
Wang, et al., "Stimultaneous Matting and Compositing", *Microsoft Research Technical Report, MSR-TR 2006-63* (May), (2006), 8 pages.
"Non-Final Office Action", U.S. Appl. No. 12/200,637, (Jun. 10, 2013), 28 pages.
"Notice of Allowance", U.S. Appl. No. 12/251,163, (Jul. 5, 2013), 5 pages.
Walles, Hayden "The Seamstress Library", Retrieved from <http://seam-carver.sourceforge.net/seamstress.pdf>, (Oct. 6, 2007), 21 pages.
"Notice of Allowance", U.S. Appl. No. 12/200,637, (Sep. 3, 2013), 8 pages.

* cited by examiner

SYSTEMS AND METHODS FOR CREATING AND EDITING SEAM CARVING MASKS

BACKGROUND

Description of the Related Art

Digital image editing is the process of creating and/or modifying digital images using a computer system. Using specialized software programs, users may manipulate and transform images in a variety of ways. These digital image editors may include programs of differing complexity such as limited-purpose programs associated with acquisition devices (e.g., digital cameras and scanners with bundled or built-in programs for managing brightness and contrast); limited bitmap editors suitable for relatively simple operations such as rotating and cropping images; and professional-grade programs such as Adobe Photoshop®, Adobe Illustrator®, and Adobe AfterEffects® (all available from Adobe Systems, Inc.) with large and complex feature sets.

Digital images may include raster graphics, vector graphics, or a combination thereof. Vector graphics data may be stored and manipulated as one or more geometric objects built with geometric primitives. The geometric primitives (e.g., points, lines, polygons, Bézier curves, and text characters) may be based upon mathematical equations to represent parts of digital images. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values.

Many digital image editing operations may be applied selectively to a portion of the digital image. In selecting a portion of the digital image, a mask may be used to define a portion of a digital image on which an operation is to be performed. A hard mask may represent a binary, "all or nothing" inclusion or exclusion of pixels. A soft mask may comprise a mask having intermediate values that lie between the minimum and maximum values for membership in the mask. For example, a soft mask may potentially comprise integer values between 0 and 255 or floating-point values between 0 and 1. Soft masks may be used for gradual blending of selected pixels into surrounding regions of the digital image. Suitable operations may be applied to modify a mask. For example, various filters (e.g., Gaussian blur, median filter, add noise, reduce noise, fragment, unsharp mask), image adjustments (e.g., levels, curves, brightness/contrast, shadow/highlight), and other operations (e.g., resizing, cropping, thresholding, rotation, perspective distortion) may be applied to masks.

A selection may represent a region of interest in the digital image and may include one or more pixels (comprising one or more color channels) and/or geometric objects. A selection may be represented by a mask having a single channel indicating per-pixel membership in the selection. If the mask is a soft mask, then the selection may have elements with partial membership (e.g., feathered edges) indicated by an intermediate value in the mask. In most digital image editors, selections may be generated in various ways. For example, a marquee tool may permit the selection of rectangular or elliptical areas in an image. A lasso tool may allow the user to draw a freehand selection area. A magic wand tool may permit the selection of parts of an image based on a color range of pixels. Facilities such as edge detection, masking, alpha compositing, and color and channel-based extraction may also be used to generate selections. The pixels and/or objects in the selection may be contiguous or non-contiguous. Masks may also be applied in image editing operations to protect certain pixels from being affected by the operations, or to steer the operations toward certain pixels. For example, a seam carving workflow may provide tools for specifying a region of an image for preservation or removal from the image.

SUMMARY

Various embodiments of systems, methods, and computer-readable storage media for creating and editing seam carving masks are disclosed. In various embodiments, the methods described herein may allow a user to combine seam carving masks to apply a combination of masks in an image editing operation, and/or to modify masks (e.g., automatically generated suggested seam carving masks, manually created seam carving masks, combination seam carving masks, or previously stored seam carving masks) using one or more tools of a graphical user interface in a graphics application.

For example, in some embodiments, the method may include accessing data representing an image, automatically generating a suggested seam carving mask for the image, where a seam carving mask comprises data representing pixels to be protected from an image editing operation (in the case of a protection mask) or targeted by an image editing operation (in the case of a removal mask).

In various embodiments, generating a suggested seam carving mask may include identifying pixels of a given color or range of colors and storing data representing the identified pixels in the suggested seam carving mask. The given color or color range may in some embodiments be specified by the user through a graphical user interface. In other embodiments, generating a suggested seam carving mask may include applying an automatic skin tone detection operation to the data representing the image to identify pixels presumed to represent skin and storing data representing the identified pixels in the suggested seam carving mask. In still other embodiments, generating a suggested seam carving mask may include identifying pixels of the image associated with energy values above or below a pre-determined threshold and storing data representing the identified pixels in the suggested seam carving mask.

In some embodiments, a user may be able to invoke an operation to automatically combine two or more stored seam carving masks specified by the user (e.g., through a graphical user interface). In response to receiving this input, the method may include merging the two or more stored seam carving masks to produce a combined seam carving mask (e.g., a suggested seam carving mask that represents the combination of the selected masks). In some embodiments, the method may include resolving any conflicts between the two or more stored seam carving masks according to a default priority, an application-specific priority, an operation-specific priority, or a user-configurable priority. For example, if one of the selected masks indicates that a given pixel should be protected and another of the selected masks indicates that the same pixel should be targeted for removal, the method may include applying a default policy such that the protection mask task overrides the removal mask, or vice versa.

In some embodiments, the method may include displaying the suggested seam carving mask as an overlay of the image. For example, the image may be displayed such that pixels indicated by the suggested seam carving mask are highlighted using a respective color or pattern (e.g., red for removal, or green for protection). In response to user input, the method may include modifying the suggested seam carving mask, e.g., adding data representing additional pixels to the suggested seam carving mask or removing data representing one or more pixels from the suggested seam carving mask, where the pixels to be added to or removed from the suggested seam carving mask are indicated in input received from a user through a graphical user interface of an image editing application (e.g., a mask brush, or mask eraser). In the case that the suggested seam carving mask represents the combination of two previously stored seam carving masks, the user may accept the combined mask (as suggested) or may modify the combined mask, as described above. For example, if the application of a default, application-specific, operation-specific, or user-configurable priority produces a suggested combined mask that is not acceptable as automatically generated, the user may apply one or more mask editing tools (e.g., a mask brush, or mask eraser) to modify the combined mask to meet the user's requirements.

In some embodiments, data representing the modified seam carving mask may be stored for use in a subsequent image editing operation directed to the image (e.g., a resizing operation, a filtering operation, or a feature identification operation) in a data structure or file configured to store such data, and may be used to protect pixels included in the mask from the operation or to identify pixels to be targeted by the application.

The methods described herein may be implemented as program instructions, (e.g., stored on computer-readable storage media) executable by a CPU and/or GPU, in various embodiments. For example, they may be implemented as program instructions that, when executed, implement generation and/or modification of seam carving masks as a stand-alone operation or in conjunction with execution of an image processing operation in a graphics application.

Figure 1A:
FIG. 1A illustrates an input image including skin tones.

While several embodiments and illustrative drawings are included herein, those skilled in the art will recognize that embodiments are not limited to the embodiments or drawings described. It should be understood, that the drawings and detailed description thereto are not intended to limit embodiments to the particular forms disclosed, but on the contrary, the intention is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follows are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The system and methods described herein may in some embodiments enable a user to combine multiple seam carving masks (created for protecting and/or removing pixels of an image) before applying them in a seam carving operation. In various embodiments, a combination mask may or may not be saved, resulting in flexibility for the user without creating a large number of masks. The methods may also allow the user to edit an automatically generated suggested mask, so that the user can change an automatic seam carving behavior by changing the suggested mask (e.g., with the help of brush tools in a GUI). In some embodiments, allowing a user to modify a suggested mask to create a custom mask may save time and effort over previous methods in which custom protection and/or removal masks must be manually created. In some embodiments, the user may be able to preview the result of a mask combining operation and/or a mask editing operation before applying it in an image editing operation.

Graphic applications include an ever-increasing number of image editing features, such as various filtering options and resizing operations (e.g., for cropping, expanding, or reducing an image). Currently available image resizing techniques include scaling techniques and seam-based techniques, also known as seam carving techniques. Seam carving, as described herein, may be used to increase or decrease the size of an image, in various embodiments. Given an image, to reduce the width, one or more seams in the image may be identified by a seam carving technique and removed from the image, while to increase the width one or more seams may be identified and replicated in the image. As used herein, the term "seam" refers to a set of pixels along a path from one edge of the image (e.g., the top of the image) to the opposite edge of the image (e.g., the bottom of the image) that satisfies the following two constraints:

1) The seam is monotonic, meaning (in this example) that its path only goes in one direction across the image (e.g., down), and does not reverse directions as it crosses the image (e.g., going down for a while and then up, or vice versa).
2) The seam comprises pixels that are "connected" to each other. In other words, for any given pixel of the seam (in this example), the pixel on the next row must be either directly below the given pixel or diagonally adjacent to the given pixel (e.g., one pixel to the left of the pixel or one pixel to the right of the given pixel on the next row). For example, from any given pixel of the seam to the next pixel of the seam, the path cannot jump to a pixel 20 pixels away in the next row.

In various embodiments, seam carving techniques may be content sensitive, or context aware. For example, given an input image, the data representing the image may be processed to generate an alternate representation of the image, which may be referred to as an energy map, which indicates the importance of each pixel in terms of image resizing. In some embodiments of a content-aware seam carving technique, the values mapped to each pixel of the input image by this energy map may be generated dependent on the pixels in its neighborhood, e.g., using a derivative function. For, example, if a white pixel is surrounded by other white pixels, it may not be considered an important pixel (with respect to a resizing operation). This is because if it is removed, it is not likely to be missed. On the other hand, if a white pixel is surrounded by black pixels, then removing it may be very noticeable and may change the content of the image. Therefore, this pixel may be mapped to a higher value by the energy map. A traditional seam carving operation may determine the energy of each pixel as the sum of the absolute gradient for each pixel. In other words, the energy of each pixel may be computed as a derivative of its neighbors, i.e., as a local energy function of the pixels adjacent to it. This energy function may define a linear relationship between the difference in intensity values of a pixel and its neighbors and the importance (or energy) of the pixel. For example, for a given pixel, if the difference between the intensity values of the pixels on its left and right is 17, the energy of the given pixel may be mapped to a value of 17.

A content-aware seam carving technique may in various embodiments assign an energy or weight to every pixel, and may use those values to identify one or more seams having a minimal cost with respect to a resizing operation. In other words, the content-aware seam carving technique may use the energy costs of each pixel to identify a path of pixels going from one edge of the image to the opposite edge of the image for which the sum of the energy values has the minimum value. In some embodiments, this determination may be solved efficiently using a technique called dynamic programming or shortest path. Once the lowest-cost seam has been identified, the image may be resized along the seam. For example, if the resizing operation is a reduction operation, the pixels associated with the lowest-cost seam may be removed. In this example, the seam carving operation would remove one pixel per row (because the seam is monotonic), and all the pixels to the right of the seam would be moved one pixel to the left to obtain an image that is one pixel narrower than the input image. By iteratively applying this technique, the image may be reduced to reach a target size and/or aspect ratio. Similarly, if the resizing operation is an expansion operation, the pixels associated with the lowest-cost seam may be replicated, and a copy of each pixel may be inserted into the image to the right of the seam. In this example, the seam carving operation would add one pixel per row, and all the pixels to the right of the seam would be moved one pixel to the right to obtain an image that is one pixel wider than the input image. By iteratively applying this technique, the image may be expanded to reach a target size and/or aspect ratio. Note that in other embodiments, rather than iteratively calculating the lowest-cost seam and duplicating it (e.g., one seam at a time) during an expansion operation, the cost of all seams may be computed up front, and then one or more of the lowest-cost seams may be duplicated until the resizing target is met. In some embodiments, the energy values for the pixels of the image and/or the lowest-cost seam may be recalculated after each iteration (e.g., after the removal or replication of a single seam). In other embodiments, the energy values may be recalculated only after the image has been resized to its target size and/or aspect ratio, or may not be recalculated at all.

The methods for seam carving described above may not be dependent on the absolute value (e.g., intensity or color) of a pixel, but only its relative value with respect to its neighbors. For example, such seam carving techniques may not distinguish between a seam going through a solid red region or a solid black region. However, in other embodiments, seam carving techniques may be dependent on color. In some such embodiments, the absolute value of pixel data (e.g., the color and/or intensity value), rather than a relative value (e.g., an intensity gradient) may be used to determine the energy value of each pixel. For example, in some embodiments a given color or range of colors may be assigned a higher energy value. In other embodiments, skin pixels may be considered to be of higher importance than other pixels in an image, and may be mapped to higher values in the energy map than other pixels. Such mappings may be performed in conjunction with, or instead of, applying a gradient function to the pixels, in various embodiments. In some embodiments, a mask may be generated that identifies pixels of a given color, within a given color range, or associated with energy values of a given range. Such a mask may in some embodiments be used to protect pixels during seam carving and/or to identify pixels to be replicated for image expansion. Such masks may be generated by an automated skin tone detector, and/or in conjunction with a user interface that allows selection of one or more high priority colors or color ranges, in various embodiments.

In various embodiments, a graphics application may include image editing operations, such as various filtering options or resizing operations (e.g., for cropping, expanding, or reducing an image) that may be able to take advantage of the existence of a mask identifying pixels to be protected or targeted by the operation. A user of such an application may be able to specify that skin pixels, or pixels in another color range, should be included or excluded from these operations, in some embodiments. An automated skin tone detector or color weighting mechanism may in some embodiments allow these operations to be automatically (or selectively) directed to areas of an image that are presumed to include skin pixels (or pixels of other selected colors), or may be used to automatically (or selectively) protect areas that include skin pixels (or pixels of other selected colors) from these operations.

Figure 1B:
FIGS. 1B-1C illustrate output images including skin tones following resizing, according to different embodiments.
Figure 1C:
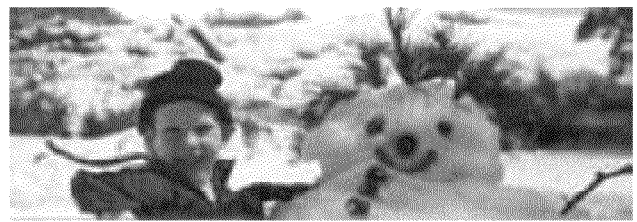

Automated skin tone detection may be invoked by default as part of executing various image processing operations in a given graphics application, or may be selectively enabled (i.e., turned on or off) in response to user input, in different embodiments. In one example, a resizing operation (e.g., a reduction operation) may be performed on the input image shown in FIG. 1A, which depicts a child and a snowman. Traditional seam carving, e.g., using a gradient function, may remove one or more horizontal seams having low-cost values (according to a gradient function applied to the pixels of those seams), resulting in the image shown in 1B. In this example, traditional seam carving may produce a resized image with undesirable results, even though the operation may have removed pixels that were determined to be "less important" (e.g., due to the presence of similar pixels nearby). In some embodiments, rather than treating all pixel values as equally important, an alternate method for seam carving may treat the pixel values corresponding to particular colors or color ranges (e.g., skin tones) as being more important than the values of other pixels. In other words, even if the intensities (or gradients) of the pixels of a given seam are low relative to those of other seams, it may be undesirable to remove the seam. Instead, the energy values (i.e., the importance) of these pixels may be weighted so that they are higher than they would be if they were based solely on the gradient (e.g., on the values of other pixels the neighborhood). Such a method may produce a resized image such as that shown in FIG. 1C. In this example, the pixels making up the face of the child were protected from removal by being more heavily weighted than those of other elements depicted in the image. In this example, the value of pixels that correspond to skin tone colors may be weighted so that a low-cost seam is less likely to pass through a region that includes skin pixels.

Figure 2:
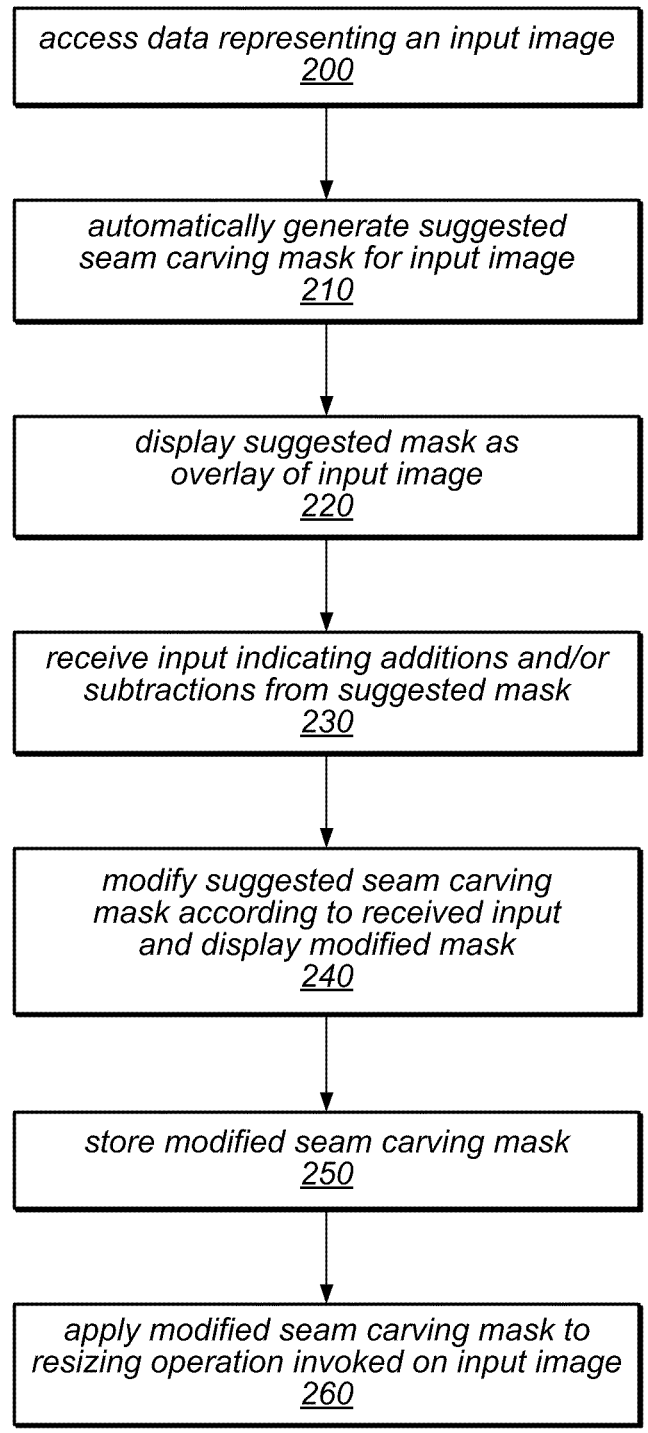
FIG. 2 is a flow chart illustrating a method for generating and modifying a seam carving mask, according to some embodiments.

One embodiment of a method for providing seam carving masks is illustrated by the flow chart in FIG. 2. As illustrated in this example, the method may include accessing data representing an input image, as in 200. For example, the data representing an input image may be accessed in response to selection of an input image on which to perform an image editing operation, which may include a content-aware resizing operation, in some embodiments. This data may be accessed in response to being imported into an application configured for image editing, or may be resident in memory accessible to such an application as a result of being imported previously, or as a result of being created and/or modified by the application prior to invocation of the desired image editing operation. Note that, as used herein, the term "image editing application" may refer to a graphic application that is specifically directed to image editing, or to any application that includes an image editing component, according to various embodiments. As shown in this example, the method may include automatically generating a suggested seam carving mask for the input image, as in 210. For example, in some embodiments, a suggested seam carving mask (e.g., a protection mask or a removal mask) may be generated in response to selection of a content-aware resizing operation, and inclusion in the mask may be based on the energy values determined by a gradient function or similar criteria. In other words, particular pixels may be included in a protection or removal mask based on the fact that an image editing application has identified them as "most important" or "least important" based on their energy values and/or on one or more pre-determined energy value thresholds specifying an upper or lower limit on energy values for pixels to be included in such masks. In various embodiments, such pre-determined thresholds may comprise a default limit for energy values, a default limit based on the frequency or distribution of energy values in the input image, an application-specific limit, and/or a user-configurable limit.

In other embodiments, a suggested seam carving mask may be generated in response to invocation of an operation to automatically generate such a mask, e.g., by selecting a "suggest protection mask", "suggest removal mask", "protect skin tones", "mask my colors" operation, or similar. For example, a user may select one or more colors or color ranges to be protected from and/or prioritized for inclusion in seam-based resizing operations by identifying them through a user interface of an image editing application (e.g., using a selection tool, pull-down menu, radio button, or alphanumeric input field), or a user may indicate that skin pixels should be protected from resizing operations by selecting a radio button associated with such features, e.g., "protect skin tones." In other embodiments, the graphics application may automatically generate a mask to protect skin tones as part of its normal operation, e.g., when a general color correction operation is invoked or when a resizing operation is performed. Generating a mask to protect (or remove) pixels in one or more color ranges may include applying a weighting function to pixel values representing user-specified or pre-determined colors or color ranges (e.g., skin tones, or other color(s) identified for protection or removal), and then determining energy values for pixels of the image (e.g., using a mapping function, look-up table, or other mechanisms) dependent on the weighting applied to the selected color or colors. For example, in some embodiments the energy values may be determined based on derived values of weighted pixel colors (e.g., an average, maximum, sum or difference of the weighted values of a pixel and its neighbors).

As shown in the example illustrated in FIG. 2, the method for providing a seam carving mask may include displaying the suggested mask to a user as an overlay of the input image, as in 220. For example, the suggested mask may be displayed to the user as a particular color "painted" over the input image to identify pixels that are included in a suggested seam carving mask (e.g., green for those included in a protection mask, or red for those prioritized for removal). As illustrated in FIG. 2, the method may include receiving input indicating additions and/or subtractions of pixels from the suggested mask, as in 230. In some embodiments, the method may include receiving input through a GUI of an image editing application (e.g., through a brush tool or other selection tool) that a user wishes to add or remove certain highlighted pixels from a suggested seam carving mask. For example, a user may employ one or more brush tools to "paint" over highlighted pixels to remove them from the suggested mask, or to "paint" over pixels that are not highlighted in order to add them to the suggested mask. In some embodiments, a user may provide input through a GUI of an image editing application identifying one or more previously generated seam carving masks that the user wishes to combine with a suggested seam carving mask to produce a modified seam carving mask. Generation of such combination masks is described in more detail below.

As shown in the example illustrated in FIG. 2, the method may include modifying the suggested seam carving mask according to the received input, and displaying the modified mask to the user, as in 240. For example, in some embodiments, each time a user indicates pixels to be added or deleted from a mask, a modified mask may be generated, and the display of the highlighted image may be refreshed to reflect the modification of the suggested mask. Similarly, each time a user selects an additional mask to be applied to the input image, a modified mask may be generated to reflect the combination of selected masks (which may include an automatically generated suggested mask), and the display of the highlighted image may be refreshed to reflect the modification of the suggested mask.

Once the modified seam carving mask has been generated and/or displayed, data representing the modified mask may be stored for later use, as in 250. For example, the modified mask may be stored for later use by one or more image editing or image processing operations of a graphics application. The modified mask may in various embodiments be applied to reduction of an image, expansion of an image, or a combination of reduction and expansion operations in order to resize the image to its target size and/or aspect ratio (as in FIGS. 1A-1C), while protecting and/or targeting particular pixels included in the modified mask.

In some embodiments, the modified mask may be applied to the input image during a subsequent seam carving operation, or during another type of image editing operation, to protect or prioritize pixels included in the mask, as in 260. For example, the method illustrated in FIG. 2 may include determining the relative costs of one or more seams of the input image using energy values that are dependent on the modified mask, and performing a resizing of the input image along one or more seam(s) determined to be of lowest cost. In other words, the modified mask may be input to such an image editing operation (e.g., a resizing operation, a filtering operation, or a feature identification operation) to direct the operation to include or exclude particular pixels during the operation, in various embodiments. In some embodiments, this may have the effect of protecting particular pixels that are of actual importance to the user and/or giving higher priority for inclusion in the resizing operation to particular pixels that are considered less important by the user without the user having to explicitly identify each and every pixel to be included in a seam carving mask.

While several of the examples included herein describe the protection of skin tones, the methods may be more generally applicable to protecting any given color or range/family of colors by adding bias to the energy function to assign a higher energy to the color or colors within a given delta of that color. For example, a user may choose to emphasize the blues or greens of an input image, instead of, or in addition to protecting skin tones. In various embodiments, a mask may be created to bias the energy function dependent on input indicating such a preference. For example, a tool in the GUI of an image editing application may be used to select a portion of an input image (e.g., an object or other collection of pixels of a given color or in a given color range) to identify pixels that should be protected or prioritized for removal. For example, a quick selection tool or color selection tool may be used to specify one or more colors to be protected, or an image editing application may include an explicit color range selection mechanism, in various embodiments. Similarly, a skin tone detection feature of a graphics application may be used in conjunction with region selection feature, e.g., to target or exclude skin pixels in a given region of an input image for an image processing operation (e.g., filtering, resizing, or feature identification).

While several of the examples above involve the protection of skin tones, the method may be more generally applicable to protecting any given color or range/family of colors by adding bias to the energy function to assign a higher energy to the color or colors within a given delta of that color. For example, a user may choose to emphasize the blues or greens of an input image, rather than skin tones. In various embodiments, a mask may be created to bias the energy function, or a tool in the application may be used to select a portion of the image (e.g., an object or color) to identify pixels of a color that should be protected. For example, a quick selection tool or color selection tool may be used to specify one or more colors to be protected, or an image editing application may include an explicit "color range" command, in various embodiments.

Figure 3:
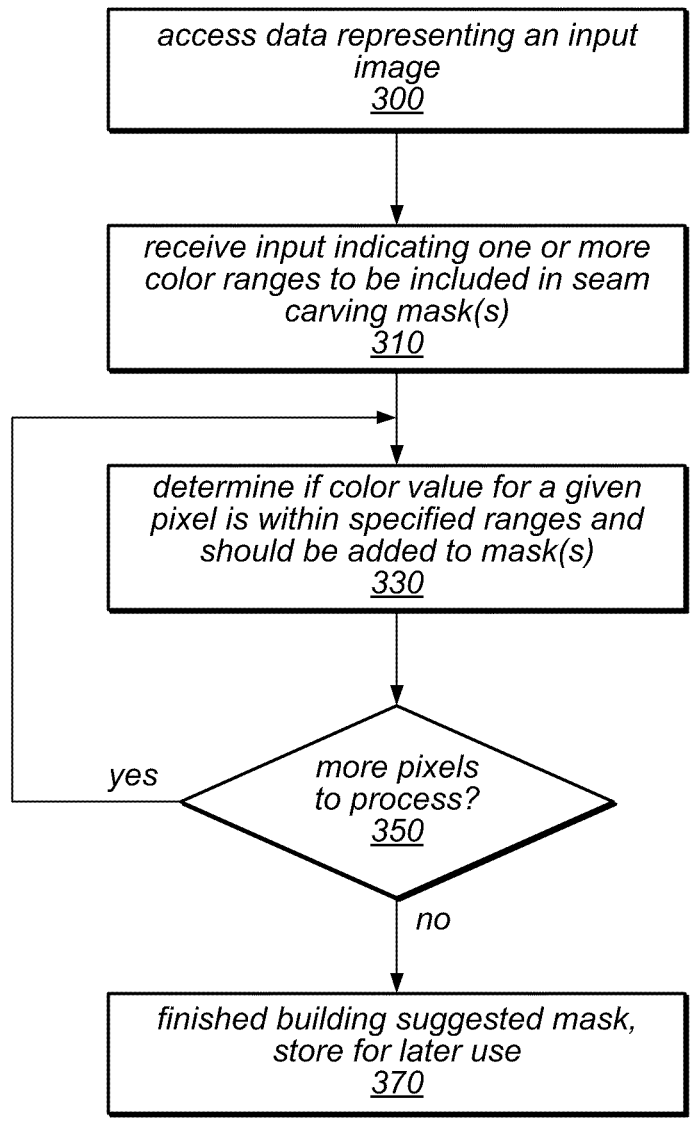
FIG. 3 is a flow chart illustrating a method for generating a suggested seam carving mask based on color-weighted priorities, according to some embodiments.

One method for generating a suggested seam carving mask is illustrated in FIG. 3. As shown in 300 of FIG. 3, the method may include accessing data representing an input image. As in the example illustrated in FIG. 2, the data representing an input image may be accessed in response to selection of an input image on which to perform an image editing operation, (e.g., a content-aware resizing operation), or in response to invocation of an operation to automatically generate such a mask, in various embodiments. As shown in 310 of FIG. 3, the method may include receiving input indicating one or more color ranges for which corresponding pixels are to be included in a seam carving mask. As described herein, this input may be received from a user through one or more tools of a GUI in an image editing application, in some embodiments.

As illustrated in 330 of FIG. 3, the method may include determining if the color value for a given pixel is within one of the specified ranges and adding it to the appropriate mask, if so. If there are more pixels to be processed, shown as the positive output from 350, the method may include repeating the operations illustrated at 330 for each remaining pixel of the input image. Once all of the pixels have been processed, shown as the negative output from 350, the mask(s) may be complete, and the method may include storing the mask(s) for later use (e.g., as a channel or layer of the image). For example, data representing the mask(s) may be stored in data structures or files configured to store an index of pixels to be included in a mask or another suitable representation of the pixels to be included in the mask, in various embodiments. This is shown as 370 in FIG. 3. In some embodiments, an automatically generated and stored seam carving mask may be identified by a name (e.g. a data structure identifier or file name) generated and/or assigned by the image editing application, while in other embodiments, the application may provide an input mechanism for the user to specify a data structure identifier or file name for the stored seam carving mask.

In different embodiments, a graphics application (e.g., an image editing application or another graphics application that includes image editing functionality) may provide various input mechanisms with which the user may indicate selections and/or input values for various parameters of image editing operations. FIGS. 4A-4D illustrate a graphical user interface of a graphics application configured to provide functionality for generating and/or editing seam carving masks, according to various embodiments. As shown in this example, the graphical user interface (GUI), may present selection tools, slider bars, pop-up menus, pull-down menus, dials, alphanumeric text entry boxes, or other mechanisms for identifying image editing operations to be invoked and/or for specifying values or relative values of various configurable parameters. For example, FIGS. 4A-4D illustrate a GUI of an image editing application (or an image editing module of another graphics application) that may provide mechanisms for a user to apply the mask generation and editing techniques described herein and to adjust one or more parameters of these operations, according to one embodiment. In this example, an image editing module may provide a selection tool and one or more user interface elements whereby a user may select and control the application of the mask generation and editing techniques described herein. The user interface may also provide user interface elements for controlling various aspects of other image editing operations and/or for performing other image editing tasks. The user interface illustrated in FIGS. 4A-4D is provided as an example of one possible implementation, and is not intended to be limiting.

Figure 4A:
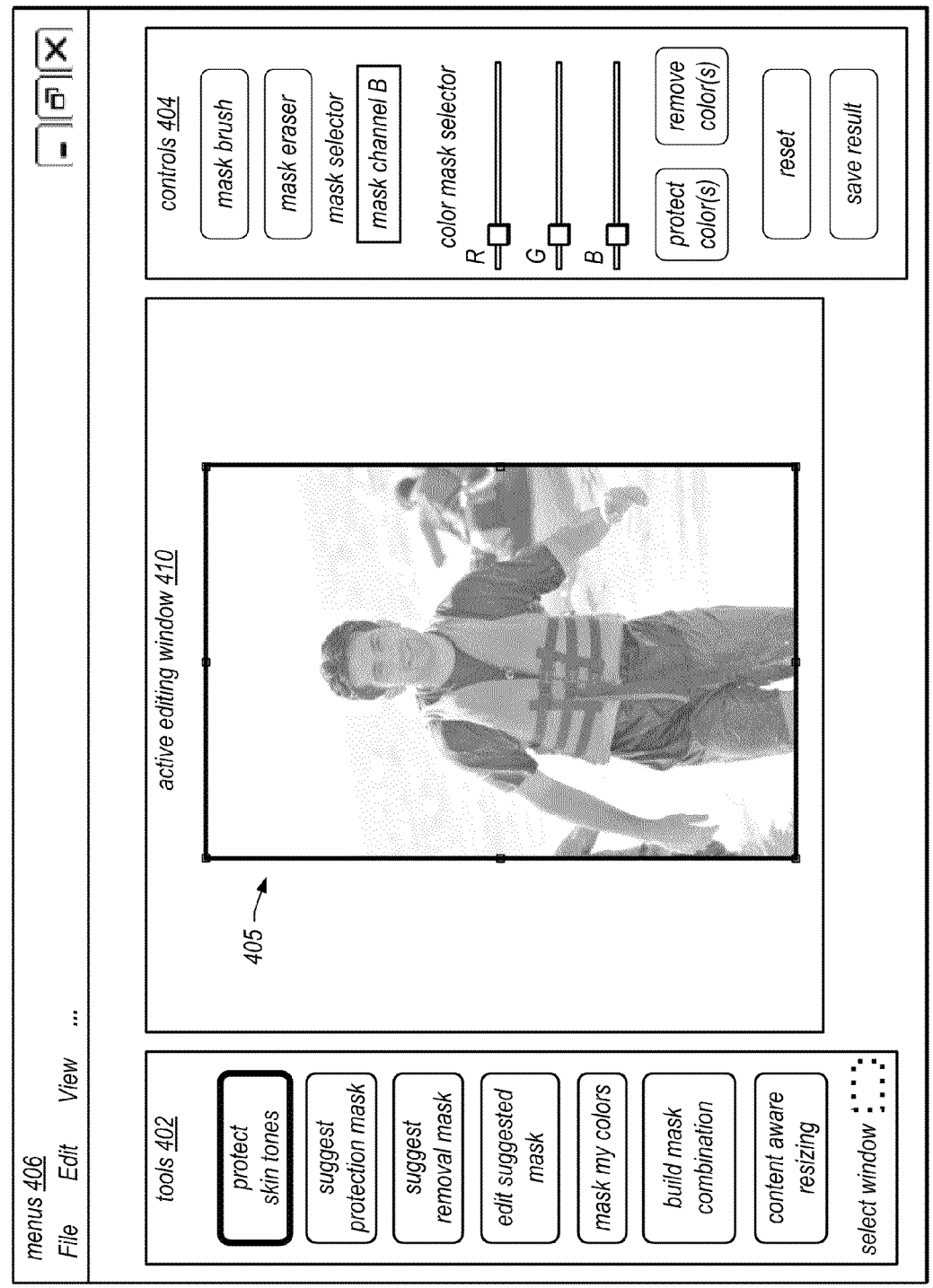
FIGS. 4A-4D illustrate a graphical user interface of a graphics application that includes seam carving mask generation and modification capability, according to some embodiments.

FIG. 4A illustrates an example display 400 depicting various frames that may be visible to a user during an image editing operation. In this example, the display is divided into four regions or areas: menus 406, tools 402, controls 404, and active editing window 410. As shown in FIG. 4A, tools area 402 may include one or more user-selectable user interface elements. In this example, it is this area that contains the user interface elements that a user may select to apply various operations (e.g., creating or editing seam carving masks, or performing content aware resizing using suggested seam carving masks and/or user-modified seam carving masks) when editing an image. As shown in the example illustrated in FIG. 4A, the user may select an operation to automatically build a skin tone mask (e.g., "protect skin tones"), a mask of user-specified colors or color ranges (e.g., "mask my colors"), a suggested seam carving mask (e.g., "suggest protection mask" or "suggest removal mask"), or a combination mask (e.g., "build mask combination"). Selection of an operation to "protect skin tones" may in some embodiments invoke the application of an automatic skin tone detector module or a more generalized color weighting module. Similarly, selection of an operation to "mask my colors" may invoke the application of a color weighting module. In some embodiments, color ranges for such an operation may be specified using one or more controls included in controls area 404 of the GUI illustrated in FIGS. 4A-4D, as described below. In various embodiments, a skin tone detector and/or a color weighting module may be configured to generate a mask of pixels having color values in a specified range and/or to weight energy values for those pixels for subsequent use by a suggested mask generator (i.e. a module that suggests protection or removal masks based on energy weighting). As shown in this example, a suggested mask generator may be explicitly invoked by selection of an operation to "suggest protection mask" or "suggest removal mask", in some embodiments. Other optional tools may be selected in tools area 402 and/or controls area 404, such as a reset function or a "save result" function.

If the user selects one of the operations invoked through the mechanisms in tools area 402, the user may be prompted to select a portion of the input image 405 being edited in active editing window 410 on which to apply the operation. In this example, the user may apply a selection tool of tools area 402 to identify a portion of the image on which to apply the selected operation. For example, the user may select a portion of image 405 by defining a window around the selection using the selection tool of tools area 402 (e.g., using a mouse, touch pad, keyboard, track ball, etc. to move a cursor across the timeline image to draw the bounding box). In some embodiments, the selected portion of the image may be displayed in active editing window 410 in response to its selection, or an indication of its selection (e.g., a bounding box) may be displayed as if overlaid on image 405 in window 410. In response to selection of an operation to automatically generate a suggested seam carving mask, such as those described above, the graphics application may be configured to highlight portions of image 405 identified for inclusion in the suggested seam carving mask. For example, in response to selecting "protect skin tones" from tools area 402 (shown in FIG. 4A by the bold boundary around "protect skin tones"), pixels of image 405 determined to include skin tones may be highlighted in the display in window 410 (e.g., as if "painted over" with a green brush). The result of this operation is illustrated in FIG. 4B, in which hatch markings are displayed over areas of image 405 determined to be skin tone pixels by an automatic skin tone detection tool.

Figure 4B:
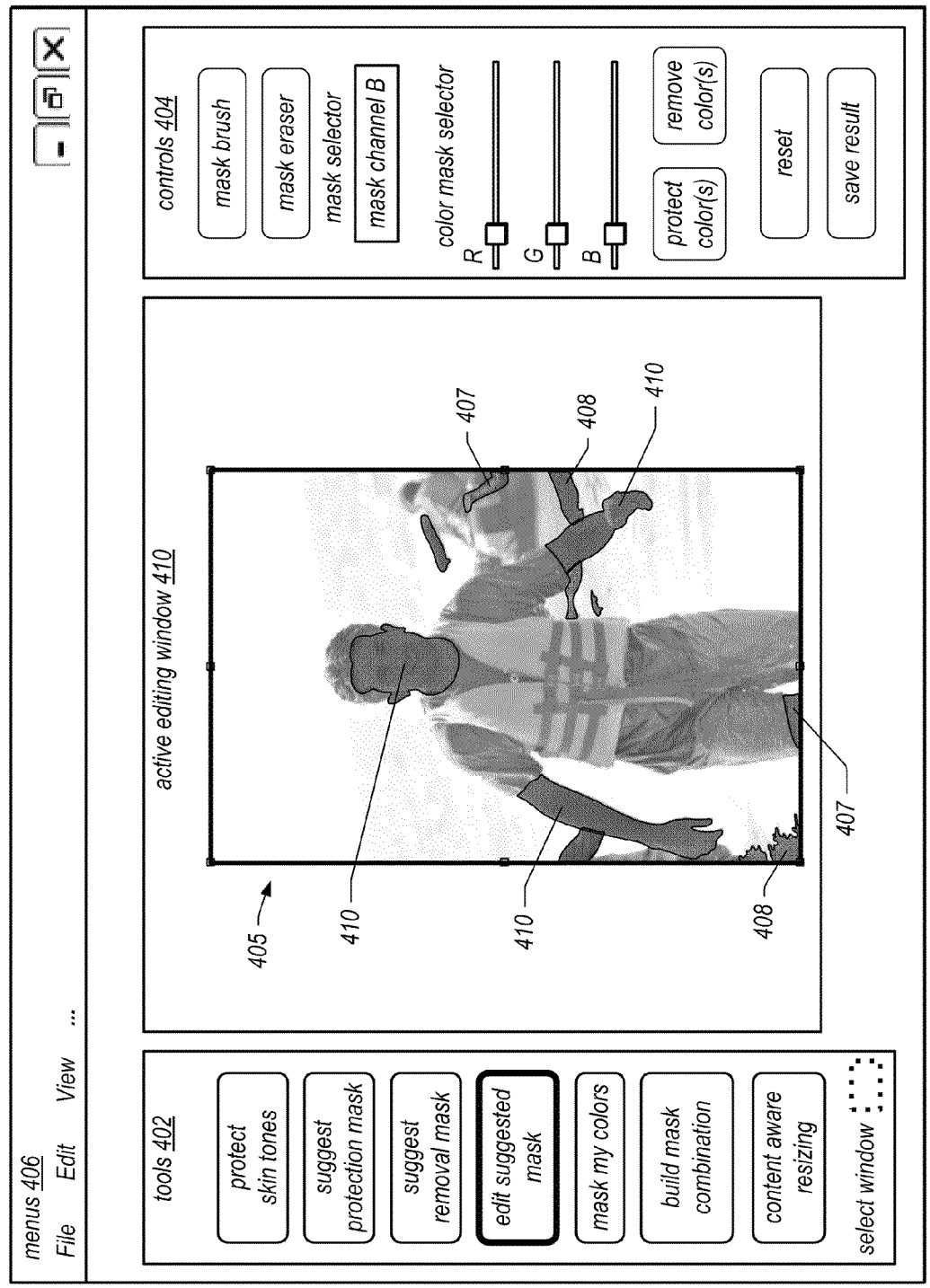

Note that some portions of image 405 that are highlighted in FIG. 4B (including those labeled as non-skin pixels 408) do not, in fact, contain skin pixels. Note also that in some cases, a user may not wish to protect all pixels containing skin tones. For example, if the man depicted in the center of image 405 is the focus of the image, the user may wish to protect all (or most) of the skin pixels associated with the man, such as those labeled as primary skin pixels 410. On the other hand, the user may not care whether other skin tone pixels (including those labeled as secondary skin pixels 407) are protected during seam carving operations or other image editing operations. In the example illustrated in FIG. 4B, the user may not care to protect the portion of the man's leg at the bottom edge of image 405 (labeled as a secondary skin pixels 407), if it would be acceptable to the user if seams including this portion of the image are removed.

Figure 4C:
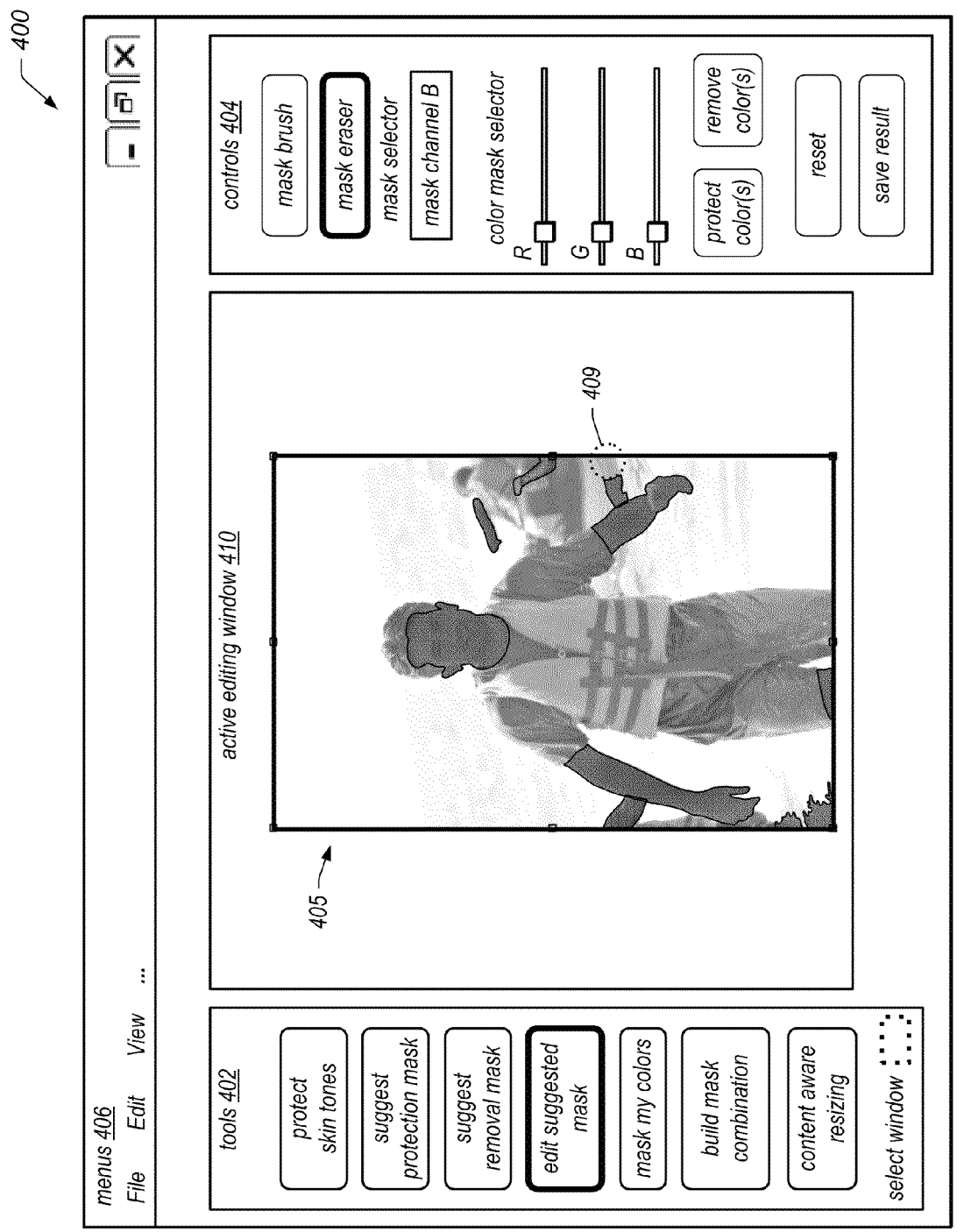
Figure 4D:
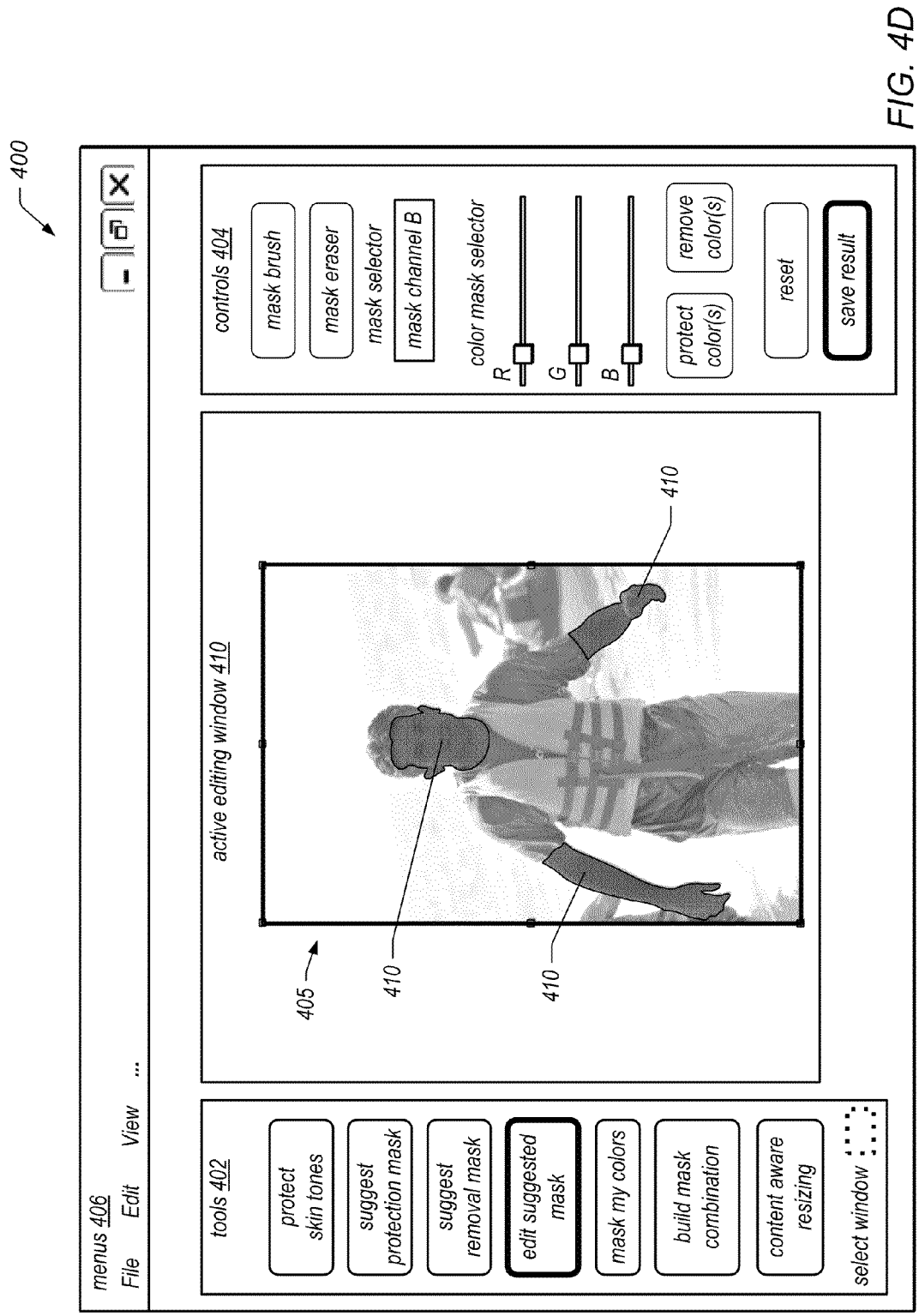

As shown in this example, the user may in some embodiments be able to select an operation to edit a suggested mask (e.g., "edit suggested mask" in tools area 402). In this example, if the user selects an operation to edit an automatically-generated suggested seam carving mask (shown in FIG. 4B by the bold boundary around the item "edit suggested mask"), the user may be able to edit the mask according to one or more parameters specified using one or more input mechanisms included in controls area 404. As illustrated in FIGS. 4A-4D, controls 404 may include one or more user-modifiable controls, such as slider bars, dials, pop-up menus, alphanumeric text entry boxes, check boxes, etc., for specifying various parameters of an image editing operation that is to be applied to a input image. For example, controls area 404 may include a mechanism to select a "mask brush" or a "mask eraser" in some embodiments. Selection of the "mask eraser" (shown in FIG. 4C by the bold boundary around the item "mask eraser" may invoke the display of an eraser tool that the user may apply to a highlighted area of image 405 (i.e. an area highlighted to designate pixels currently included in a seam carving mask) to remove pixels from the mask (e.g., by dragging the tool across the highlighted area while a button is pressed). Similarly, selection of the "mask brush" may invoke the display of a brush tool that the user may apply to unhighlighted areas (i.e. an area containing pixels that are not currently included in a seam carving mask) to add pixels to the mask (e.g., by dragging the tool across the highlighted area while a button is pressed). FIGS. 4C-4D illustrate the application of a "mask eraser" brush to remove pixels from a suggested skin tone protection mask that the user does not wish to protect from a seam carving operation. For example, the pixels may be removed by the user because they are not actually skin tone pixels (e.g., they were incorrectly identified as skin tone pixels by an automatic skin tone detector, such as non-skin pixels 408), or because they are skin tone pixels in an area or object of image 405 that is not considered to be important to protect from a seam carving operation, such as secondary skin pixels 407.

In some embodiments, as a "mask brush" or "mask eraser" is applied to a highlighted image, the display of the highlighted image may be refreshed to provide a preview of the results of the modification made to the suggested seam carving mask. FIG. 4C illustrates a preview image that is generated and/or updated as a mask editing session takes place, and specifically, during an operation to remove pixels from the suggested skin tone mask shown in FIG. 4B. In this example, some non-skin pixels 408 have already been removed from the suggested mask depicted in FIG. 4B (in highlighted image 405), and a mask eraser tool is being applied to another non-skin area to remove additional non-skin pixels 408 from the suggested mask. This is shown in FIG. 4C as the circular window 409 being dragged across an area of image 405 in response to selection of the "mask eraser" operation. As window 409 is dragged across highlighted areas of 405, the pixels located within the bounds of window 409 are removed from the suggested skin tone mask. Note that a "mask eraser" or "mask brush" may be applied to any type of mask, including a skin tone mask, a color weighting mask, a protection mask, or a removal mask, whether it was automatically generated or not. For example, in some embodiments, a "mask eraser" or "mask brush" may be applied by a user to edit a previously saved seam carving mask or a mask built as the combination of two or more masks.

FIG. 4D illustrates a preview image of the result of the mask editing exercise described above. In this example, only the pixels labeled as primary skin pixels 410 remain highlighted for inclusion in a skin tone protection mask as a result of the mask editing exercise. As illustrated in FIGS. 4A-4D, pixels originally designated as skin tone pixels (in the suggested skin tone mask), but that were subsequently removed from the suggested mask by the user, include skin tone pixels of people in the background of image 405 (including some labeled as secondary skin pixels 407 in FIG. 4B), skin tone pixels at the bottom edge of image 405 that can be removed without negatively affecting the composition of image 405 (e.g., secondary skin pixels 407 on the man's leg), and non-skin pixels 408 (e.g., pixels depicting water that were incorrectly identified by the automatic skin tone detector as being skin tone pixels). In some embodiments, if the preview result is acceptable to the user, the user may elect to save the modified skin tone mask for use during one or more seam carving operations. This is shown in FIG. 4D by the bold boundary around item "save result" in controls area 404. Conversely, if the preview result is not acceptable (at this time or at any other time), the results may be discarded, e.g., by selection of the "reset" item in controls area 404. In some embodiments, invocation of a content aware resizing operation (e.g., by selection of the item "content aware resizing" in tools area 402) may cause a currently displayed seam carving mask to be applied during the resizing operation, whether or not it has been modified and/or saved since its selection or automatic generation.

As noted above, if a user selects a "mask my colors" operation in tools area 402, the user may be able to specify the colors to include in a protection mask and/or a removal mask using mechanisms included in controls area 404. In the example illustrated in FIGS. 4A-4D, the user may specify one or more colors using slider bars to specify the RGB components of a color, and the graphics application may be configured to automatically identify (and highlight) pixels of that color and/or colors having RGB components within a predetermined delta of the specified color. As shown in this example, the user-specified color or color range may be included in a protection mask or a removal mask, as specified by a pull-down menu, radio button, or other input mechanism in controls area 404.

In some embodiments, if a user selects a "build mask combination" operation in tools area 402, the user may be able to specify one or more previously generated and saved seam carving masks to include in a combined protection mask and/or a combined removal mask using mechanisms included in controls area 404. In the example illustrated in FIGS. 4A-4D, the user may identify masks to be combined using a pull-down menu or text entry box of controls area 404. In some embodiments, the user may select two or more protection masks, two or more removal masks or any combination of saved protection or removal masks to be combined for a given image editing exercise. One method for resolving conflicts between selected masks is described below in reference to FIG. 6. In some embodiments, the user may be able to specify (for each selected mask) whether to apply the mask as a protection mask or a removal mask (not shown).

While FIGS. 4A-4D illustrate several of the elements in tools area 402 and 404 as buttons, other types of user interface elements, such as pop-up menus, pull-down menus, or text entry boxes, may be used to select from among one or more tools in various embodiments. In various embodiments, the reset tool illustrated in FIGS. 4A-4D may or may not be included in the user interface. Various embodiments may include other tools not shown, as well, such as an "undo" tool that undoes the most recent user action in active editing window 410.

In some embodiments, various operations (such as those illustrated in FIGS. 4A-4D an described above) may produce an output file in the same folder as the input image, or an output file whose name and/or location are specified using the "File" element in menus area 406. In some embodiments, a user may be able to specify a file name or other location at which the results (e.g., various seam carving masks and/or output images) should be stored, using the "File" element of menu area 406, in this example.

In various embodiments, controls area 404 may include other input mechanisms such as additional pull-down menus, pop-up menus, slider bars, or other mechanisms usable to specify values of other configurable parameters for image editing functions provided by the graphics application.

In the example illustrated in FIGS. 4A-4D, menus 406 may include one or more menus, for example menus used to navigate to other displays in the video editing application, open files, display or save files, undo/redo actions, view one or more selected representations of a video clip, and so on. In some embodiments, an image file (e.g., an input or output file containing image data and metadata associated with an image) or a file containing data representing a seam carving mask may be identified by the user through the "File" option in menu area 406. This menu item may include, for example, a user-selectable pull-down option for importing one or more images or masks from an identified file and/or for specifying and name and/or location of an output file, as described above. In the example illustrated in FIGS. 4A-4D, active editing window 410 is the area in which an image being edited is displayed as various editing operations are performed. In various embodiments and at various times, active editing window 410 may display a portion of an input image to which an editing operation is to be applied, or a portion of a resulting (modified) image, an output image, or any intermediate image produced as part of the image editing operation, as described herein.

In the example illustrated in FIGS. 4A-4D, menu 406 includes a "view" option. This menu item may include, for example, a user-selectable pull-down or pop-up menu usable to select which of various representations of an image (e.g., an input image, an image highlighted to include an automatically generated suggested seam carving mask, an image highlighted to display an edited and/or combined seam carving mask, etc.) are displayed in active editing window 410, or in another area of display 400. In other embodiments, different input mechanisms may be provided for selecting a view to be displayed, such as one or more radio buttons, alphanumeric text boxes, dials, etc. In some embodiments, one of the available viewing options may be a "split view", in which two or more representations of an image may be simultaneously displayed (e.g., an input image and a corresponding preview image may be displayed while the user applies an editing operation). In some embodiments, as the user iteratively applies the techniques described herein, the system may be configured to automatically update and/or store the data representing the preliminary results of the operation. The system may also be configured to automatically refresh the image 405 and a preview image of a modified version of image 405 being displayed in response to these updates.

In some embodiments, a user may be prompted to provide one or more of the inputs described above in response to invoking an operation of the graphics application. In other embodiments, the graphics application may provide default values for any or all of these inputs. In some embodiments, the user may be allowed to override one or more default parameter values using an interface similar to that illustrated in FIGS. 4A-4D.

Figure 5:
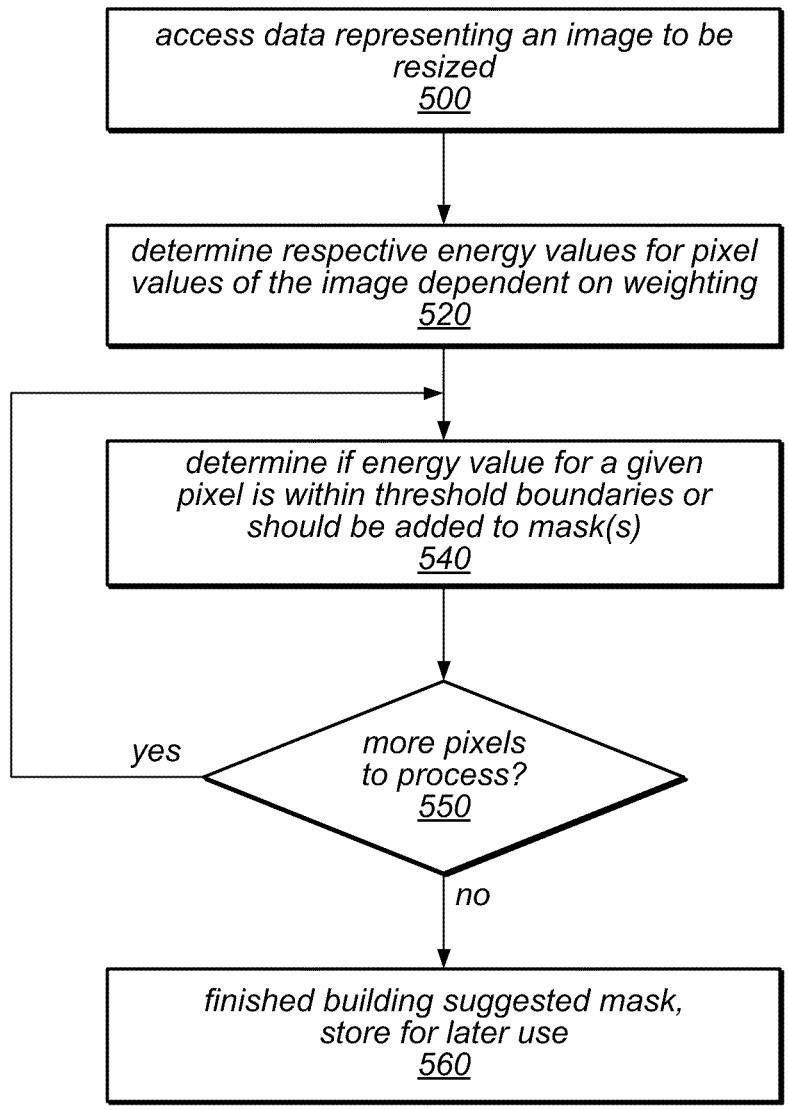
FIG. 5 is a flow chart illustrating a method for building a suggested seam carving mask based on energy values, according to some embodiments.

One method for generating a suggested seam carving mask using energy values rather than absolute color values is illustrated in FIG. 5. As shown in 500 of FIG. 5, the method may include accessing data representing an input image. As in previous examples, the data representing an input image may be accessed in response to selection of an input image on which to perform an image editing operation, (e.g., a content-aware resizing operation), or in response to invocation of an operation to automatically generate such a mask, in various embodiments. This data may be accessed in response to being imported into an application configured for image editing, or may be resident in memory accessible to such an application as a result of being imported previously, or as a result of being created and/or modified by the application prior to the desired image editing operation. As shown in 520 of FIG. 5, the method may include determining respective energy values for the pixel values in the input image. As previously described, these energy values may be calculated using a mapping function, look-up table, or other mechanisms, and may or may not be dependent on any color-based weighting (e.g., on an average, maximum, sum or difference of the weighted values of a pixel and its neighbors), in different embodiments.

As illustrated in 540 of FIG. 5, the method may include determining if the energy value for a given pixel is within one or more specified energy threshold boundaries, and adding it to the appropriate mask, if so. For example, if the range of energy values for each pixel in the image is from 0 to 255 (i.e. where 0 represents the lowest possible energy and 255 represents the highest possible energy), the method may include identifying pixels with energies greater than 200 and automatically including those in a protection mask. Similarly, pixels having energies less than 50 may be automatically included in a removal mask. If there are more pixels to be processed, shown as the positive output from 550, the method may include repeating the operations illustrated at 550 for each remaining pixel of the input image. Once all of the pixels have been processed, shown as the negative output from 550, the mask(s) may be complete, and the method may include storing the mask(s) for later use (e.g., as a channel or layer of the image). For example, data representing the mask(s) may be stored in data structures or files configured to store an index of pixels to be included in a mask or another suitable representation of the pixels to be included in the mask, in various embodiments. This is shown as 560 in FIG. 5. In some embodiments, an automatically generated and stored seam carving mask may be identified by a name (e.g. a data structure identifier or file name) generated and/or assigned by the image editing application, while in other embodiments, the application may provide an input mechanism for the user to specify a data structure identifier or file name for the stored seam carving mask.

As previously noted, one or more seam carving masks, as described herein, may be used in conjunction with various image processing operations to target or exclude certain pixels in those operations, and in some embodiments a user may be able to combine two or more seam carving masks for such operations. One method for combining seam carving masks for application in a seam carving operation is illustrated by the flow chart in FIG. 6. In this example, the method may include accessing data representing an input image, as in 600. This data may be accessed in response to being imported into an application configured for image editing, or may be resident in memory accessible to such an application as a result of being imported previously, or as a result of being created and/or modified by the application prior to the desired resizing operation. As in previous examples, the data representing an input image may be accessed in response to selection of an input image on which to perform an image editing operation, (e.g., a content-aware resizing operation), or in response to invocation of an operation to build a combination mask from two or more seam carving masks, in various embodiments. The data accessed may represent a whole image or a portion of an image on which an image editing operation is to be applied, in different embodiments. For example, in one embodiment, a user may select a portion of an image on which to perform a resizing operation using a selecting tool or a cropping tool of an image editing application. The user may also select a target size, expansion/reduction target (e.g., a percentage increase or decrease in one or more dimensions) and/or target aspect ratio for a resizing operation using various user interface elements (e.g., pull-down menus, radio buttons, or alphanumeric input fields), in various embodiments.

Figure 6:
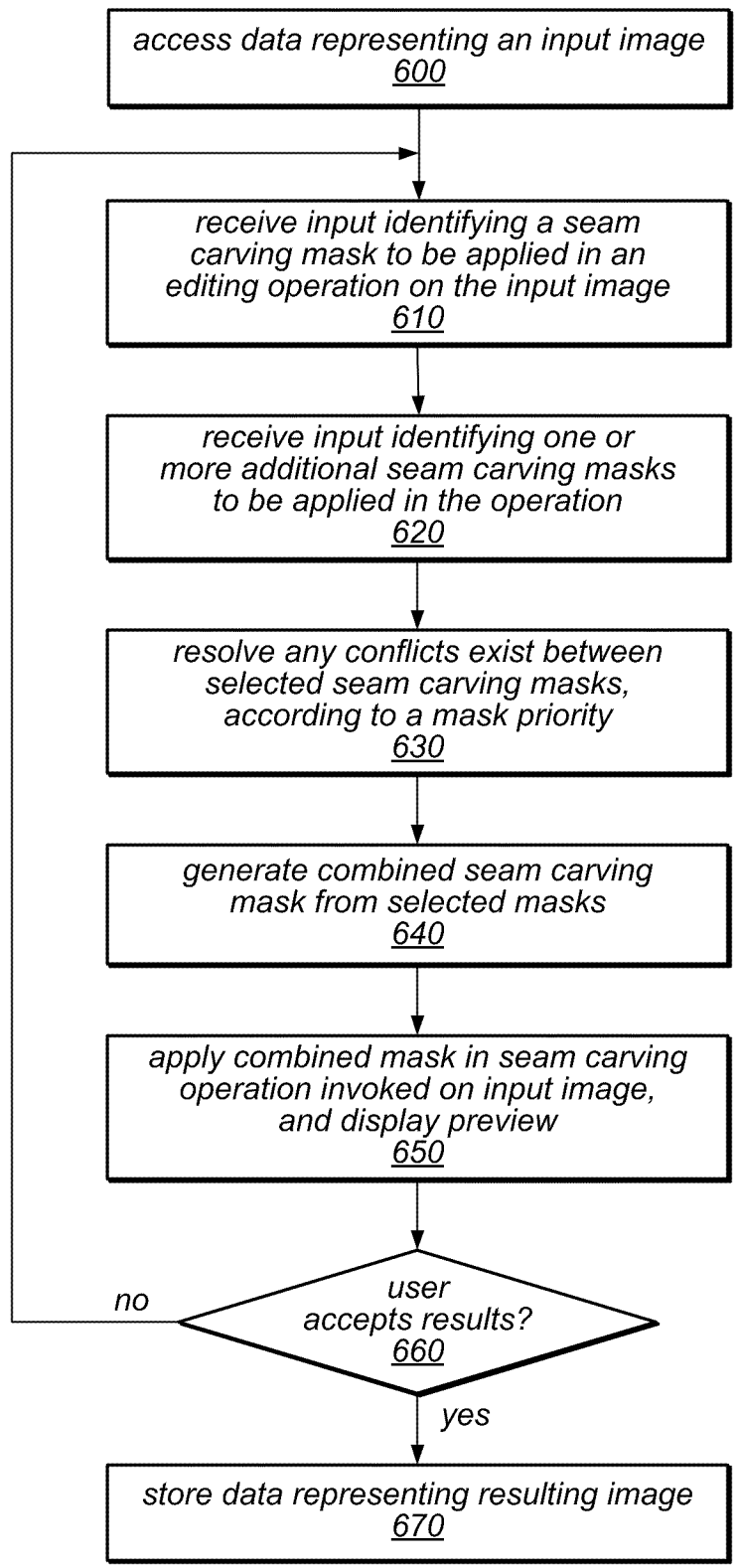
FIG. 6 is a flow chart illustrating a method for building a combined seam carving mask and applying it in a seam carving operation, according to some embodiments.

As illustrated in FIG. 6, the method may include receiving input identifying a seam carving mask to be applied in an editing operation on the input image, as in 610. In some embodiments, this input may identify a suggested seam carving mask to be automatically generated in response to its selection (e.g., a suggested seam carving mask to be generated by the selection of a skin tone detection operation, a color masking operation, or another operation that generates a suggested protection or removal mask, as described herein). In other embodiments, this input may identify a previously generated and/or stored seam carving mask (e.g., an existing automatically generated, manually generated, or user-modified seam carving mask) to be applied to the input image.

As shown in this example, the method may include receiving input identifying one or more additional seam carving masks to be applied in the editing operation, as in 620. Again, this input may identify one or more suggested seam carving masks to be automatically generated in response to its selection, and/or one or more existing seam carving masks, in different embodiments. In some embodiments, as part of selecting a seam carving mask (at 610) or additional seam carving masks (at 620), the user may be able to specify (e.g., by selecting a radio button or pull-down menu option) whether each mask is to be used as a protection mask (i.e. to protect the pixels identified by the mask) or as a removal mask (i.e. to cause the identified pixels to be more likely to be removed by the editing operation). In some embodiments, a user may be able to specify that a mask originally generated for use as a protection mask should be used as a removal mask for the current operation, or vice versa.

As illustrated in 630 of FIG. 6, the method may include resolving any conflicts between selected seam carving masks, according to a mask priority. For example, in some embodiments, if one seam carving mask identifies a pixel for protection and another identifies it for removal, the protection mask may take priority by default. In other embodiments, the removal mask may take priority by default. In some embodiments, the user may be able to specify whether protection or removal masks take priority, or such a priority may be operation-specific or application-specific. In still other embodiments, a user may be able to specify the relative priority of each mask when each is selected, or in response to an indication that such a conflict has been detected by the image editing application. As described above, where there are no conflicts between selected masks, a combination removal mask may include all pixels identified for removal by any of the selected masks, and a combination protection mask may include all pixels identified for protection by any of the selected masks. Once any conflicts have been resolved, the method may include generating the combined seam carving mask from the selected masks, as in 640. Note that in some embodiments, this combined seam carving mask(s) may be saved in a data structure or file for subsequent use (not shown).

In some embodiments, the combined seam carving mask may be applied in a seam carving operation, and a preview of the results of the operation may be displayed for the user, as in 650. For example, the data may be provided to a display component of the graphics application for display of the resized image to the user and/or the data may be stored as in intermediate image by the application for further processing by the application (or by another application) or as a final image (e.g., written to main memory, a file, an archive, etc.). In performing the seam carving operation, respective energy values may be determined for each of the pixels of the input image based, at least in part, on the combined seam carving mask(s). These energy values may be determined using a derivative function or another parametric function, or by any of various other methods (e.g., using a mapping function, look-up table, or other mechanisms) dependent on the weighting indicated in the combined seam carving mask(s) (i.e. a combined protection mask and/or a combined removal mask). The relative cost of various seams of the image may be determined dependent on these energy values (e.g., by calculating a sum, average, or weighted average of the energy values of the pixels making up the seam), and the input image may be resized along one or more of the seams determined to have the lowest costs (e.g., removing or replicating each of these lowest cost seams). In this example, seams that include pixels identified in a combined protection mask may be less likely to be removed or replicated than other seams, while seams that include pixels identified in a combined removal mask may be more likely to be removed or replicated than other seams.

If the results of the seam carving operation are unacceptable, shown as the negative output of 660, they may be discarded and the user may be able to select a different combination of masks to be applied to the input image. This is shown as the feedback from 660 to 610 in FIG. 6. If the results are acceptable, shown as the positive output of 660, the method may include storing data representing the resulting image, as in 670.

Some embodiments of the system described herein may include a means for detecting skin tone pixels. For example, a skin tone detection module may analyze color and/or intensity values of the pixels of an image to determine which, if any, are associated with colors in a range presumed to be skin tones, and may store indicators of those pixels as a seam carving mask (e.g., a protection mask), as described in detail herein. The skin tone detection module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform analyzing color and/or intensity values of the pixels of an image to determine which, if any, are associated with colors in a range presumed to be skin tones, and storing indicators of those pixels as a seam carving mask (e.g., a protection mask), as described in detail herein. Other embodiments of the skin tone detection module may be at least partially implemented by hardware circuitry and/or firmware stored, for example, in a non-volatile memory.

In some embodiments, automated skin tone detection may be performed as part of an image editing operation, and may be used to target skin pixels or non-skin pixels for the operation, or to exclude skin pixels or non-skin pixels from the operation. The operation may produce a modified version of the image, which may be rendered to a display device. For example, skin tone detection may be performed in conjunction with a filtering operation, a color correction operation, or a resizing operation, to target the operation to skin pixel or to protect skin pixels from the operation. In other embodiments, automated skin tone detection may be performed in conjunction with an image identification operation, i.e., an operation to identify a face, a human being, or adult content (e.g., pornographic elements) in the input image.

Some embodiments of the system described herein may include a means for applying a weighting to energy values associated with pixels of an image based on their color and/or intensity values. For example, a color weighting module may analyze color and/or intensity values of the pixels of an image to determine which, if any, are associated with colors in a specified range. The color weighting module may store indicators of those pixels as a seam carving mask (e.g., a protection mask or removal mask), and/or may apply a weighting to those pixels, and store indicators of those pixels for subsequent use in determining the energy values of those pixels for a seam carving operation, as described in detail herein. The color weighting module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform analyzing color and/or intensity values of the pixels of an image to determine which, if any, are associated with colors in a specified range, storing indicators of those pixels as a seam carving mask (e.g., a protection mask or removal mask), applying a weighting to those pixels, and/or storing indicators of those weighted pixels for subsequent use in a seam carving operation, as described in detail herein. Other embodiments of the color weighting module may be at least partially implemented by hardware circuitry and/or firmware stored, for example, in a non-volatile memory.

Some embodiments of the system described herein may include a means for automatically generating a suggested seam carving mask. For example, a suggested mask generation module may analyze pixel values, energy values associated with pixels, and/or data representing one or more previously stored seam carving masks (e.g., masks selected for combination) to generate suggested protection and/or removal masks, and may store data representing those masks for later use, as described in detail herein. The suggested mask generation module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform analyzing pixel values, energy values associated with pixels, and/or data representing one or more previously stored seam carving masks (e.g., masks selected for combination) to generate suggested protection and/or removal masks, and storing data representing those masks for later use, as described in detail herein. Other embodiments of the suggested mask generation module may be at least partially implemented by hardware circuitry and/or firmware stored, for example, in a non-volatile memory.

Some embodiments of the system described herein may include a means for editing a previously generated seam carving mask (e.g., an automatically generated mask, a manually created mask, or a combination mask built from other masks). For example, a mask editing module may provide tools (e.g., a mask brush or mask eraser) that a user may apply to a previously generated seam carving mask to produce a modified seam carving mask, and may store that modified seam carving mask for later use, as described in detail herein. The mask editing module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform providing tools (e.g., a mask brush or mask eraser) that a user may apply to a previously generated seam carving mask to produce a modified seam carving mask, and storing that modified seam carving mask for later use, as described in detail herein. Other embodiments of the mask editing module may be at least partially implemented by hardware circuitry and/or firmware stored, for example, in a non-volatile memory.

Some embodiments of the system described herein may include a means for combining previously generated seam carving masks. For example, a mask synthesis module may merge two protection masks into a combined protection mask, merge two removal masks into a combined removal mask, or combine one or more protection masks and removal masks (resolving any conflicts) into a combination mask, and may store those combination masks for later use, as described in detail herein. The mask synthesis module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform merging two protection masks into a combined protection mask, merging two removal masks into a combined removal mask, or combining one or more protection masks and removal masks (resolving any conflicts) into a combination mask, and storing those combination masks for later use, as described in detail herein. Other embodiments of the mask synthesis module may be at least partially implemented by hardware circuitry and/or firmware stored, for example, in a non-volatile memory.

Figure 7:
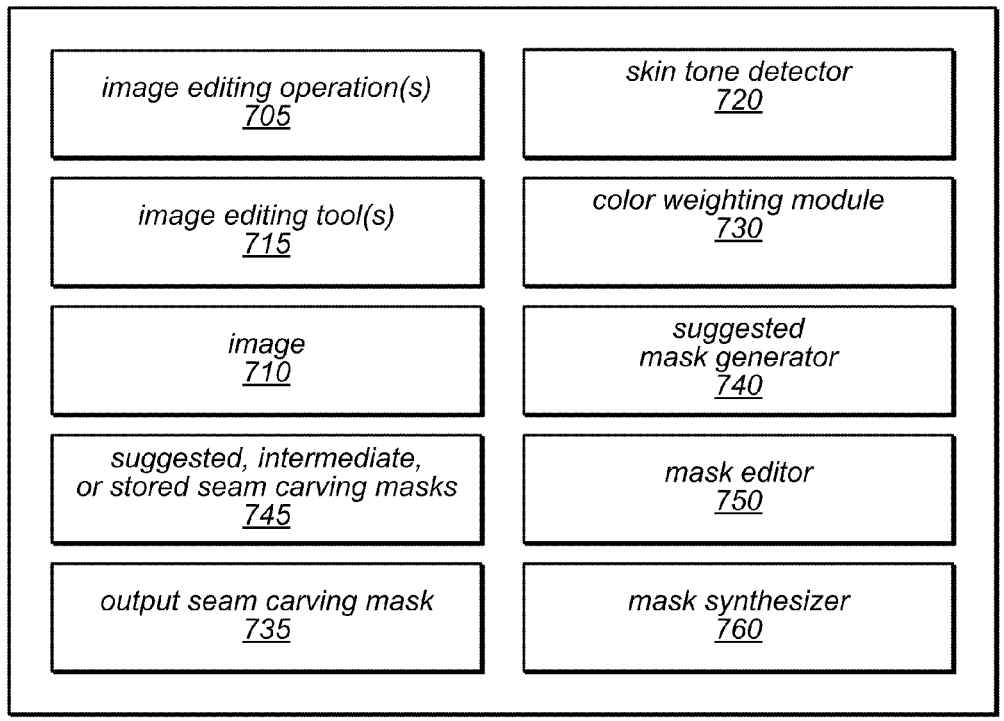
FIG. 7 is a block diagram illustrating an embodiment of a digital image editing program configured for mask generation and mask editing.

FIG. 7 is a block diagram illustrating an embodiment of a digital image editing application (or an image editing application of a graphics application) configured for seam carving mask generation and editing, as described herein. In this example, digital image editing program 700 may comprise one or more image editing operations 705 and may provide one or more image editing tools 715. In one embodiment, a suitable product such as Adobe Photoshop®, Adobe Illustrator®, or Adobe AfterEffects® (all available from Adobe Systems, Inc.) may be used as the image editing program 700. The image editing program 700 may be used to create and/or modify a digital image 710. The image editing operations 705 and/or image editing tools 715 may comprise suitable operations for modifying pixels and/or geometric objects of the image 710. For example, various filters (e.g., Gaussian blur, median filter, add noise, reduce noise, fragment, unsharp mask), image adjustments (e.g., levels, curves, brightness/contrast, shadow/highlight), and other operations (e.g., resizing, cropping, thresholding, rotation, perspective distortion) may be applied to images (including selections within an image) and/or masks (e.g., protection or removal masks). As illustrated in FIG. 7, in some embodiments, image editing program 700 may be configured to access, generate, store, and/or operate on one or more images 710 or suggested, intermediate and/or stored seam carving masks 745, and may be configured to generate and/or store one or more output seam carving masks 735 as a result of various image editing operations.

As illustrated in FIG. 7, image editing program 700 may include a skin tone detector module 720, a color weighting module 730, a suggested mask generator 740, a mask editor 750, and/or a mask synthesizer 760. In various embodiments, these modules may be coded as an intrinsic part of the image editor 700 or as a plug-in module or other extension to the image editor 700. The image editing program 700 and its constituent elements and data may in some embodiments be stored in a memory of a computer system, shown as graphics application 920 in FIG. 9.

As described herein, a suggested mask generator 740 may be configured to automatically generate a suggested protection or removal mask dependent on energies associated with pixels of an image 710, dependent on a default or user-specified color-weighting of image pixels, or dependent on pixels included in one or more other masks selected as part of an exercise to build a combination mask, in various embodiments. In some embodiments, a mask synthesizer 760 may be configured to merge or otherwise combine data associated with two or more masks selected as part of an exercise to build a combination mask, as described herein.

As described herein, a color weighting module 730 may be configured to assign higher weights to pixels of image 710 in a specified color range and/or to create a protection or removal mask that includes pixels so weighted. In other embodiments, color weighting module 730 may be called by suggested mask generator 740, in order to identify pixels to be included in a color-weighted protection mask generated by suggested mask generator 740. For example, color weighting modulo 730 may be configured to identify pixels having color and/or intensity values in a specified color range and to assign a higher weighting to them in response to the invocation of a color-weighting operation, or as part of generating a suggested protection mask based on energy values. Because color weighting module 730 assigns a higher weight to pixels in a specified range of colors, these pixels may be included in a suggested protection mask 745 generated by module 740, and seams including these pixels may be less likely to be affected by a seam carving operation applied to the image 710.

As described herein, a skin tone detector module 720 may be configured to automatically identify skin tone pixels in an image, such as image 710 illustrated in FIG. 7, and may also be configured to create a skin tone protection mask that includes those pixels. In other embodiments, the skin tone detector module 720 may be called by the color weighting module 730 and/or by suggested mask generator 740, in order to identify skin tone pixels to be included in a color-weighted protection mask generated by suggested mask generator 740. For example, skin tone detector 720 may be configured to identify skin tone pixels and to assign a higher weighting to them as part of another color-weighting operation or as part of generating a suggested protection mask based on energy values. Because the skin tone detector assigns a higher weight to skin tone pixels, they may be included in a suggested protection mask 745 generated by module 740, and seams including these pixels may be less likely to be affected by a seam carving operation applied to the image 710.

In some embodiments, mask editor 750 may provide tools for editing a suggested, intermediate, or stored seam carving mask 745 and generating an output seam carving mask 735. For example, mask editor 750 may provide an interface through which a user may invoke various image editing tools 715 (e.g., a mask brush or mask eraser), and/or an interface through which a user may apply various image editing operations 705 (e.g., content aware resizing, resetting an image to discard preview results of an image editing exercise, or saving results of an image editing exercise).

Figure 8:
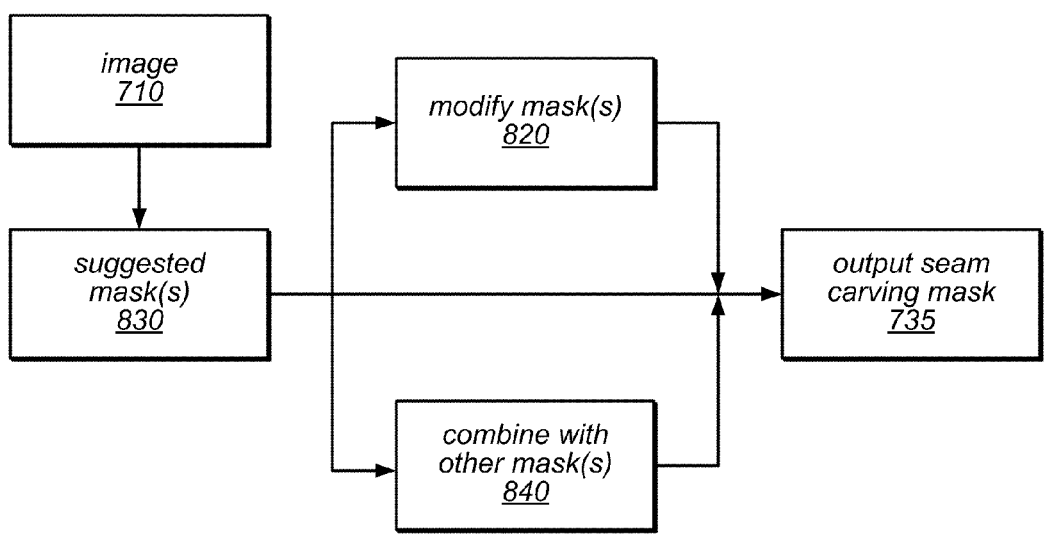
FIG. 8 illustrates a workflow associated with seam carving mask generation and modification, according to some embodiments.

FIG. 8 illustrates a workflow associated with seam carving mask generation and editing, according to one embodiment. As illustrated in FIG. 8, output seam carving mask 735 may be generated, at least in part, based on pixels in the input image 710. As illustrated in FIG. 8, one or more suggested masks 830 may be generated for image 710, such as by a skin tone detector 720, color weighting module 730, and/or suggested mask generator 740. For example, skin tone detector 720 may be configured to analyze the pixels of image 710 to determine which, if any, have color or intensity values in a range considered to encompass skin tones, and to include any pixels determined to represent skin in a suggested protection mask 830. In another example, color weighting module 730 may be configured to analyze the pixels of image 710 to determine which, if any, have color or intensity values in a specified color range, and to include any pixels determined to represent those colors in a suggested protection or removal mask 830. In yet another example, suggested mask generator 740 may be configured to analyze the pixels of image 710 to determine energy values for each pixel (e.g., based on a gradient function, with or without color-based weighting), and to include any pixels determined to be within a particular energy value range in a suggested protection or removal mask 830.

As illustrated in FIG. 8, in some embodiments, one or more of suggested mask(s) 830 may be modified (as shown in 820) to produce output seam carving mask 735. For example, in some embodiments, a suggested mask 830 may be modified using an image editing tool 715 (e.g., a mask brush or mask eraser), accessed through a mask editor 750. In other embodiments, a suggested mask 830 may be combined with one or more other masks (as shown in 840) to produce output seam carving mask 735. For example, in some embodiments, mask synthesizer 760 may be configured to combine a suggested protection mask with one or more other protection masks and/or with one or more removal masks in response to user input received through mask editor 750. In still other embodiments, a suggested mask 830 may be modified by both mask editing operations and through combination with one or more other masks, in any order or combination, to produce output seam carving mask 735. Note that while the example illustrated in FIG. 8 is a workflow that modifies an automatically suggested seam carving mask, in alternate embodiments, the mask editing and mask combination techniques described herein may be applied to any type of seam carving mask (i.e. those generated automatically, manually, or through a previous mask editing or combing operation) or to any combination of such masks (not shown).

Figure 9:
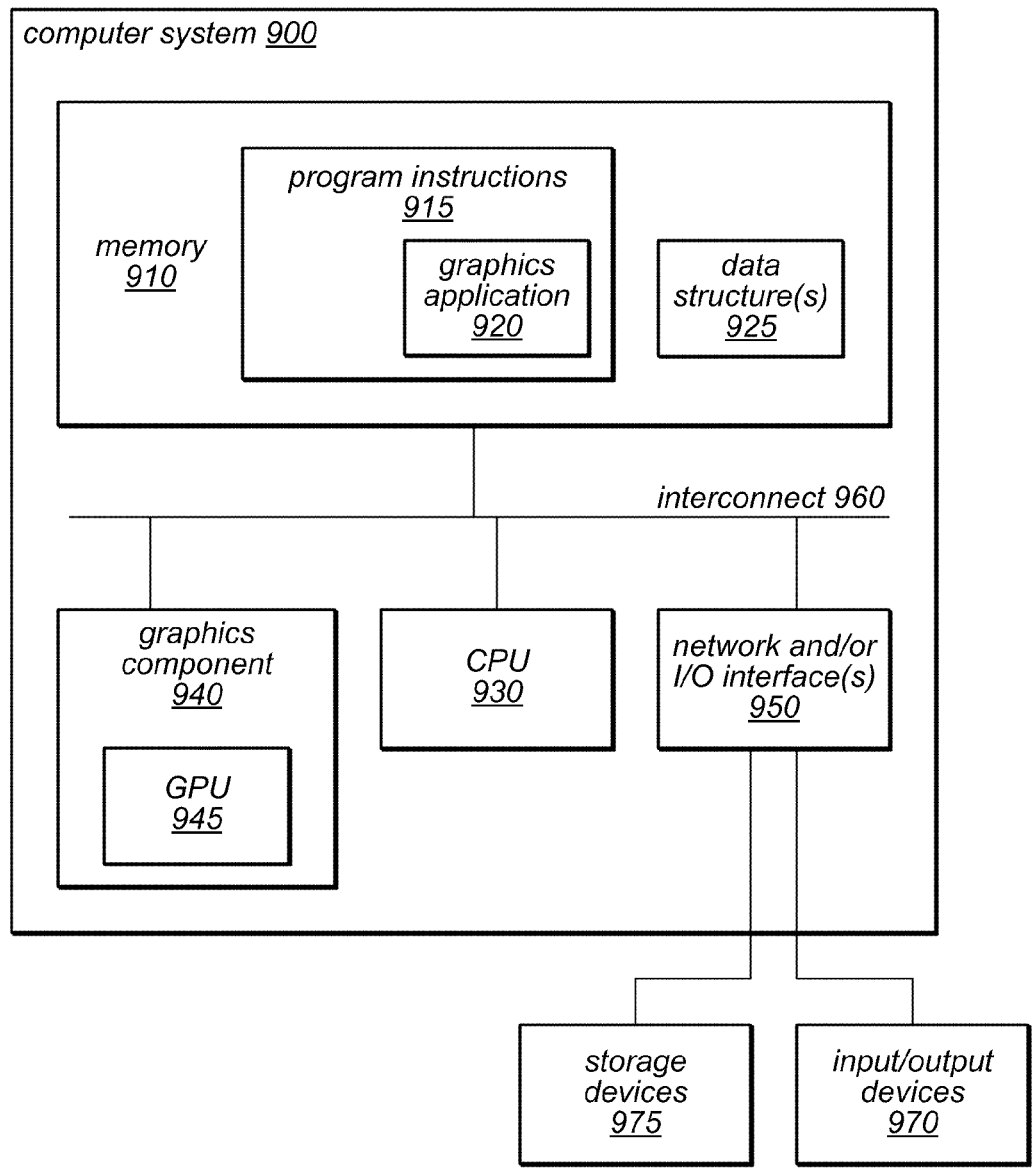
FIG. 9 illustrates a computer system configured for implementing generation and modification of seam carving masks, according to one embodiment.

The methods described herein for creating and editing seam carving masks may be implemented by a computer system configured to provide the functionality described. FIG. 9 is a block diagram illustrating constituent elements of a computer system 900 that is configured to implement embodiments of the systems and methods described herein, according to one embodiment. Computer system 900 may be one of any of various types of devices, including, but not limited to, a personal computer system, desktop computer, laptop, notebook or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device. As illustrated in FIG. 9, computer system 900 may in various embodiments include memory 910, a graphics component 940, one or more processor units (CPUs) 930, and one or more network and/or input/output interfaces 950. The illustrated components, including processor(s) 930, system memory 910, and others, may be coupled to each other by at least one communications bus, shown as interconnect 960 (e.g., a system bus, LDT, PCI, ISA, or other communication bus type), and/or by interface 950 (e.g., an ATM interface, an Ethernet interface, a Frame Relay interface, or other network interface). The CPU 930, the interface 950, and the memory 910 may be coupled to the interconnect 960. It should also be noted that one or more components of system 900 might be located remotely and accessed via a network, in some embodiments.

Processors 930 may be implemented using any desired architecture or chip set, such as the SPARC™ architecture, an x86-compatible architecture from Intel Corporation or Advanced Micro Devices, or another architecture or chipset capable of processing data, and may in various embodiments include multiple processors, a single threaded processor, a multi-threaded processor, a multi-core processor, or any other type of general-purpose or special-purpose processor. Any desired operating system(s) may be run on computer system 900, such as various versions of Unix, Linux, Windows® from Microsoft Corporation, MacOS® from Apple Corporation, or any other operating system that enables the operation of software on a hardware platform.

System memory 910 may include one or more of cache, SRAM, DRAM, RDRAM, EDO RAM, DDR RAM, SDRAM, Rambus RAM, EEPROM, or other memory type), or other types of RAM or ROM. Memory 910 may include other types of memory as well, or combinations thereof. One or more of memories 910 may include program instructions 915 executable by one or more of processors 930 to implement aspects of the mask generation and editing techniques and/or image processing operations described herein. Program instructions 915, which may include program instructions configured to implement graphics application 920, may be partly or fully resident within the memory 910 of computer system 900 at any point in time. Alternatively, program instructions 915 may be provided to CPU 930 and/or GPU 945 for performing skin tone detection and/or image processing operations (or portions thereof) on CPU 930 and/or GPU 945 using one or more of the techniques described herein. In some embodiments, the techniques described herein may be implemented by a combination of program instructions 915 executed on one or more processors 930 and one or more GPUs 945, respectively. Program instructions 915 may also be stored on an external storage device 975 accessible by the processor(s) 930 and/or GPU 945, in some embodiments. Any of a variety of such storage devices may be used to store the program instructions 915 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage devices may be coupled to the processor(s) 930 and/or GPU 945 through one or more interfaces including, but not limited to, interconnect 960 or interface 950, as described herein. In some embodiments, the program instructions 915 may be provided to the computer system 900 via any suitable computer-readable storage medium including memory 910 and/or external storage devices 975 described above. Memory 910 may also be configured to implement one or more data structures 925, such as one or more data structures configured to store data representing one or more input images, output images, or intermediate images (e.g., during processing of the images), or one or more seam carving masks. Data structures 925 may be accessible by processor(s) 930 and/or GPU 945 when executing graphics application 920 or other program instructions 915.

As described herein, a graphics application such as graphics application 920 may be configured to perform automated suggested mask generation and/or to provide functionality to facilitate mask editing and/or mask combining as part of various image processing functions and may render new images according to the functions performed and any applicable masks. For example, graphics application 920 may perform reductions and/or expansions of various images using seam carving techniques while protecting pixels of the input images identified by one or more protection masks, according to various embodiments. In another example, graphics application 920 may perform identification skin tone pixels or pixels in other color ranges to produce suggested seam carving masks, in some embodiments. Graphics application 920 may be configured to render output images to a separate window, or directly into the same frame buffer containing the corresponding input images, in different embodiments. Graphics application 920 may represent various types of graphics applications, such as painting, publishing, photography, games, animation, and other applications. Additionally, graphics application 920 may utilize graphics processor 945 when processing, rendering, or displaying images according to various embodiments.

Graphics application 920 may be provided as a computer program product, or software, that may include a computer-readable storage medium having stored thereon instructions, which may be used to program a computer system (or other electronic devices) to implement the mask generation and mask editing methods, and/or image processing operations described herein. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

As noted above, in some embodiments, memory 910 may include program instructions 915, comprising program instructions configured to implement graphics application 920, as described herein. Graphics application 920 may be implemented in various embodiments using any desired programming language, scripting language, or combination of programming languages and/or scripting languages, e.g., C, C++, C#, Java™, Perl, etc. For example, in one embodiment, graphics application 920 may be JAVA based, while in another embodiments, it may be implemented using the C or C++ programming languages. In other embodiments, graphics application 920 may be implemented using specific graphic languages specifically for developing programs executed by specialized graphics hardware, such as GPU 945. In addition, graphics application 920 may be embodied on memory specifically allocated for use by graphics processor(s) 945, such as memory on a graphics component 940 including graphics processor(s) 945. Thus, memory 910 may represent dedicated graphics memory as well as general-purpose system RAM, in various embodiments. Other information not described herein may be included in memory 910 and may be used to implement the methods described herein and/or other functionality of computer system 900.

Note that program instructions 915 may be configured to implement various modules described above (e.g., a skin tone detector, color weighing module, mask editor, mask synthesizer, or suggested mask generator) as stand-alone applications, or as modules of another graphics application or graphics library, in various embodiments. For example, in one embodiment program instructions 915 may be configured to implement graphics applications such as painting, publishing, photography, games, animation, and/or other applications, and may be configured to detect and/or protect skin pixels in images as part of one or more of these graphics applications. In another embodiment, program instructions 915 may be configured to implement the techniques described herein in one or more functions called by another graphics application executed on GPU 940 and/or processor(s) 930. Program instructions 915 may also be configured to render images and present them on one or more displays as the output of an image processing operation and/or to store image data for processed images in memory 910 and/or an external storage device(s) 975, in various embodiments. For example, a graphics application 920 included in program instructions 915 may utilize GPU 940 when detecting skin tone pixels or pixels in other color ranges, or when generating, editing, rendering, or displaying images or masks in some embodiments.

As illustrated in FIG. 9, a specialized graphics card or other graphics component 940 may be coupled to the processor(s) 930. The graphics component 940 may include a graphics processing unit (GPU) 945. Additionally, the computer system 900 may include or be coupled to one or more imaging devices, such as input/output devices 970. The one or more imaging devices may include various types of raster-based imaging devices such as monitors and printers. In one embodiment, one or more display devices may be coupled to the graphics component 940 for display of data provided by the graphics component 940 (not shown).

A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 940 may implement a number of graphics primitive operations in a way that makes executing them much faster than drawing directly to the screen with a host central processing unit (CPU), such as CPU 930. In various embodiments, the methods described herein for detecting skin tones and/or processing an image may be implemented by program instructions configured for parallel execution on two or more such GPUs. The GPU 945 may implement one or more application programmer interfaces (APIs) that permit programmers to invoke the functionality of the GPU. Suitable GPUs may be commercially available from vendors such as NVIDIA Corporation, ATI Technologies, and others. In some embodiments, graphics component 940 may interface with the motherboard of computer system 900 by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 9, memory 910 may represent any of various types and arrangements of memory, including general-purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth. Hybrid solutions may also share memory with the system memory, but may have a smaller amount of memory on-board than discrete or dedicated graphics cards to make up for the high latency of system RAM. Data communicated between the graphics processing unit 940 and the rest of the computer system 900 may travel through a graphics card slot or other interface, such as interconnect 960 of FIG. 900.

Interface 950 may be configured to enable computer system 900 to communicate with other computers, systems or machines, such as across a network. A network interface 950 may use standard communications technologies and/or protocols, and may utilize links using technologies such as Ethernet, 802.11, integrated services digital network (ISDN), digital subscriber line (DSL), and asynchronous transfer mode (ATM) as well as other communications technologies. Similarly, the networking protocols used on a network to which computer system 900 is interconnected may include multi-protocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over such a network by network interface 950 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

Computer system 900 may also include one or more additional I/O interfaces 950, such as interfaces for one or more input/output devices 970, or such devices may be coupled to computer system 900 via a network interface 950. For example, computer system 900 may include interfaces to a keyboard, a mouse or other cursor control device, a joystick, or other user input devices 970, in various embodiments. Additionally, the computer system 900 may include one or more displays, coupled to processors 930 and/or other components via interconnect 960 or I/O interface 950. Such input/output devices may be configured to allow a user to interact with graphics application 920 to request various image processing operations and/or to specify various parameters, thresholds, and/or other configurable options available to the user when processing images by executing graphic application 920. It will be apparent to those having ordinary skill in the art that computer system 900 may also include numerous other elements not shown in FIG. 9.

While various mask creation and mask editing techniques have been described herein with reference to various embodiments, it will be understood that these embodiments are illustrative and are not meant to be limiting. Many variations, modifications, additions, and improvements are possible. More generally, various techniques are described in the context of particular embodiments. For example, the blocks and logic units identified in the description are for ease of understanding and are not meant to be limiting to any particular embodiment. Functionality may be separated or combined in blocks differently in various realizations or described with different terminology. In various embodiments, actions or functions described herein may be performed in a different order than illustrated or described. For example, in various embodiments, the elements shown in FIGS. 2, 3, 5, and 6 may be performed in a different order than the illustrated order. Any of the operations described may be performed programmatically (i.e., by a computer according to a computer program). Any of the operations described may be performed automatically (i.e., without user intervention).

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope as defined in the claims that follow.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A system, comprising:
one or more processors; and
memory, communicatively coupled to the one or more processors, storing instructions executable by the one or more processors to perform operations comprising:
computing an energy value for each pixel in an image based, at least in part, on a derivative of a neighboring pixel;
generating a seam carving mask for the image based, at least in part, on the computing, the seam carving mask comprising data representing one or more pixels to be protected from or targeted by an image editing operation;
displaying the seam carving mask as an overlay of the image;
in response to receiving user input, modifying the displayed seam carving mask, the modifying comprising adding data representing one or more additional pixels to the seam carving mask or removing data representing at least a subset of the one or more pixels from the seam carving mask; and
storing data representing the modified seam carving mask for use in a subsequent image editing operation directed to the image.

2. The system of claim 1, wherein the seam carving mask is a protection mask indicating pixels to be protected during a seam carving operation or a removal mask indicating pixels to be prioritized for removal during a seam carving operation.

3. The system of claim 1,
wherein displaying the seam carving mask as an overlay of the image comprises highlighting the pixels indicated by the seam carving mask using a respective color or pattern; and
wherein the respective color or pattern indicates whether the seam carving mask is a protection mask or a removal mask.

4. The system of claim 1, wherein generating the seam carving mask comprises:
identifying pixels of a particular color or range of colors; and
storing data representing the identified pixels as the seam carving mask.

5. The system of claim 1, wherein generating the seam carving mask comprises:
applying an automatic skin tone detection operation to data representing the image to identify pixels presumed to represent skin; and
storing data representing the identified pixels in the seam carving mask.

6. The system of claim 1, wherein generating the seam carving mask comprises:
receiving input specifying two or more previously stored seam carving masks; and
combining the two or more previously stored seam carving masks to produce the seam carving mask.

7. The system of claim 6, wherein generating the seam carving mask further comprises resolving a conflict between the two or more previously stored seam carving masks according to a default priority, an application-specific priority, an operation-specific priority, or a user-configurable priority, the conflict including one of the two or more previously stored seam carving masks identifying a particular pixel for protection while another of the two or more previously stored seam carving masks identifying the particular pixel for removal.

8. The system of claim 1, wherein generating the seam carving mask comprises identifying pixels of the image associated with energy values above or below a pre-determined threshold.

9. The system of claim 1, wherein the user input comprises an indication to add one or more pixels to the seam carving mask or an indication to remove one or more pixels from the seam carving mask.

10. A computer-readable storage memory storing instructions computer-executable to perform operations comprising:
generating a suggested seam carving mask for an image based, at least in part, on a difference in weighted energy values of a pixel in the image relative to another pixel adjacent to the pixel in the image;
displaying the suggested seam carving mask as an overlay of the image;
in response to receiving user input, modifying the suggested seam carving mask, the modifying comprising adding data representing one or more additional pixels to the suggested seam carving mask or removing data representing at least a subset of the one or more pixels from the suggested seam carving mask; and
storing data representing the modified seam carving mask for use in a subsequent image editing operation directed to the image.

11. The computer-readable storage memory of claim 10,
wherein displaying the suggested seam carving mask as an overlay of the image comprises highlighting the pixels indicated by the suggested seam carving mask using a respective color or pattern; and
wherein the respective color or pattern indicates whether the suggested seam carving mask is a protection mask or a removal mask.

12. The tangible computer-readable storage medium of claim 10, the difference in energy values not being dependent on a color value of the pixel in the image.

13. The computer-readable storage memory of claim 10, wherein generating the suggested seam carving mask comprises:
receiving input specifying two or more seam carving masks; and
combining the two or more seam carving masks to produce the suggested seam carving mask.

14. The computer-readable storage memory of claim 10, wherein generating the suggested seam carving mask comprises identifying pixels of the image associated with energy values above or below a pre-determined threshold, the pre-determined threshold comprising a default limit based on the distribution of energy values in the image.

15. The computer-readable storage memory of claim 10, wherein the user input comprises an indication of one or more pixels to be added to the suggested seam carving mask or one or more pixels to be removed from the suggested seam carving mask.

16. A method, comprising:
- automatically and without user input, generating a suggested seam carving mask for an image based, at least in part, on a difference in energy values of a pixel in the image relative to another pixel adjacent to the pixel in the image, wherein the suggested seam carving mask comprises data representing one or more pixels to be protected from or targeted by an image editing operation;
- displaying, by a computing device, the suggested seam carving mask as an overlay of the image; and
- in response to receiving user input, modifying the suggested seam carving mask, the modifying comprising adding data representing one or more additional pixels to the suggested seam carving mask or removing data representing at least a subset of the one or more pixels from the suggested seam carving mask.

17. The method of claim 16,
- wherein displaying the suggested seam carving mask as an overlay of the image comprises highlighting the pixels indicated by the suggested seam carving mask using a respective color or pattern; and
- wherein the respective color or pattern indicates whether the suggested seam carving mask is a protection mask or a removal mask.

18. The method of claim 16, wherein generating the suggested seam carving mask comprises:
- identifying pixels of a particular color or pixels of a particular range of colors; and
- storing data representing the identified pixels as the suggested seam carving mask.

19. The method of claim 16, wherein generating the suggested seam carving mask comprises:
- receiving a selection of two or more stored seam carving masks; and
- combining the selected two or more stored seam carving masks to produce the suggested seam carving mask.

20. The method of claim 16, wherein the user input comprises an indication to add one or more pixels to the suggested seam carving mask or an indication to remove one or more pixels from the suggested seam carving mask.

* * * * *